United States Patent
Kim et al.

(10) Patent No.: US 12,487,703 B2
(45) Date of Patent: Dec. 2, 2025

(54) TOUCH DEVICE AND DRIVING METHOD FOR CORRECTING TOUCH ELECTRODE OUTPUT SIGNALS

(71) Applicant: HiDeep, Inc., Seongnam-si (KR)

(72) Inventors: Giduk Kim, Seongnam-si (KR); Hwanhee Lee, Seongnam-si (KR)

(73) Assignee: HIDEEP, INC., Seongnam-si (KR)

( * ) Notice: Subject to any disclaimer, the term of this patent is extended or adjusted under 35 U.S.C. 154(b) by 58 days.

(21) Appl. No.: 18/205,460

(22) Filed: Jun. 2, 2023

(65) Prior Publication Data

US 2023/0393690 A1    Dec. 7, 2023

(30) Foreign Application Priority Data

Jun. 3, 2022  (KR) .................. 10-2022-0068382
Oct. 13, 2022 (KR) .................. 10-2022-0131771

(51) Int. Cl.
G06F 3/041    (2006.01)
G06F 3/0354   (2013.01)
G06F 3/046    (2006.01)

(52) U.S. Cl.
CPC ........ G06F 3/0418 (2013.01); G06F 3/03545 (2013.01); G06F 3/046 (2013.01)

(58) Field of Classification Search
CPC ..... G06F 3/0418; G06F 3/03545; G06F 3/046
See application file for complete search history.

(56) References Cited

U.S. PATENT DOCUMENTS

| | | | |
|---|---|---|---|
| 9,710,106 B2 | 7/2017 | Chun et al. | |
| 2014/0062948 A1* | 3/2014 | Lee | G06F 3/046 345/174 |
| 2014/0092023 A1 | 4/2014 | Lo et al. | |
| 2016/0179269 A1 | 6/2016 | Chun et al. | |
| 2021/0173437 A1* | 6/2021 | Bae | G06F 1/1616 |
| 2024/0077974 A1* | 3/2024 | Haran | G06F 3/0446 |

FOREIGN PATENT DOCUMENTS

| | | |
|---|---|---|
| JP | 2016-119102 | 6/2016 |
| JP | 2019-61544 | 4/2019 |

OTHER PUBLICATIONS

EPO, Search Report of EP 23176926.6 dated Oct. 10, 2023.

* cited by examiner

*Primary Examiner* — Benjamin C Lee
*Assistant Examiner* — Nathan P Brittingham
(74) *Attorney, Agent, or Firm* — LEX IP MEISTER, PLLC

(57) ABSTRACT

A touch device according to an example embodiment includes a plurality of touch electrodes each of which has a first end and a second end, a plurality of first traces that is connected to the first ends of a plurality of first touch electrodes among the plurality of touch electrodes, a plurality of second traces that is connected to the second ends of a plurality of second touch electrodes among the plurality of touch electrodes, and a touch controller configured to correct the plurality of first output signals and/or the second output signals based on a first reference output signal of a first touch electrode adjacent to the plurality of second touch electrodes among a plurality of first output signals received through the plurality of first traces, and a second reference output signal of a second touch electrode adjacent to the plurality of first touch electrode among a plurality of second output signals received through the plurality of second traces.

20 Claims, 25 Drawing Sheets

FIG. 5A
FIG. 5B
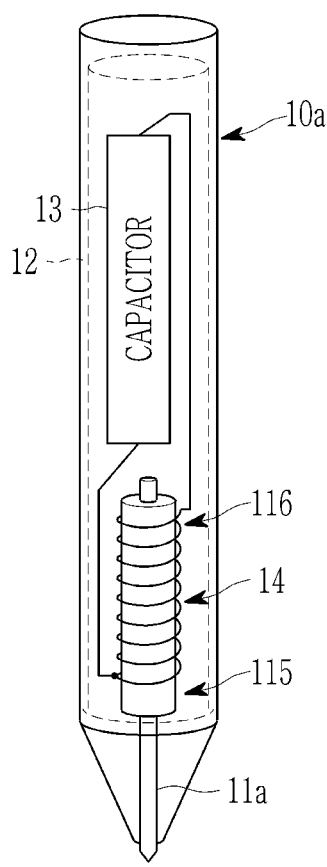
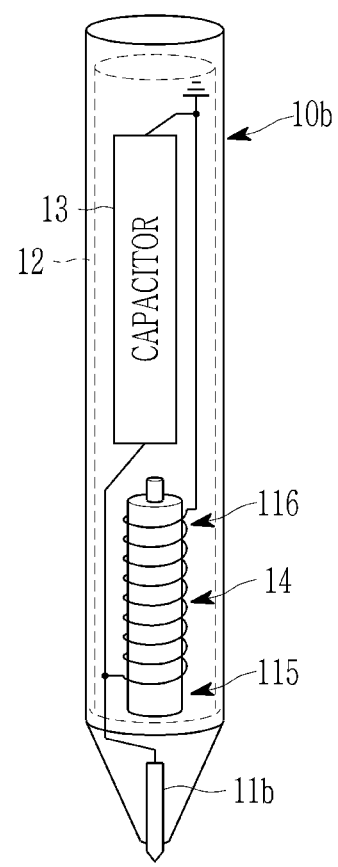

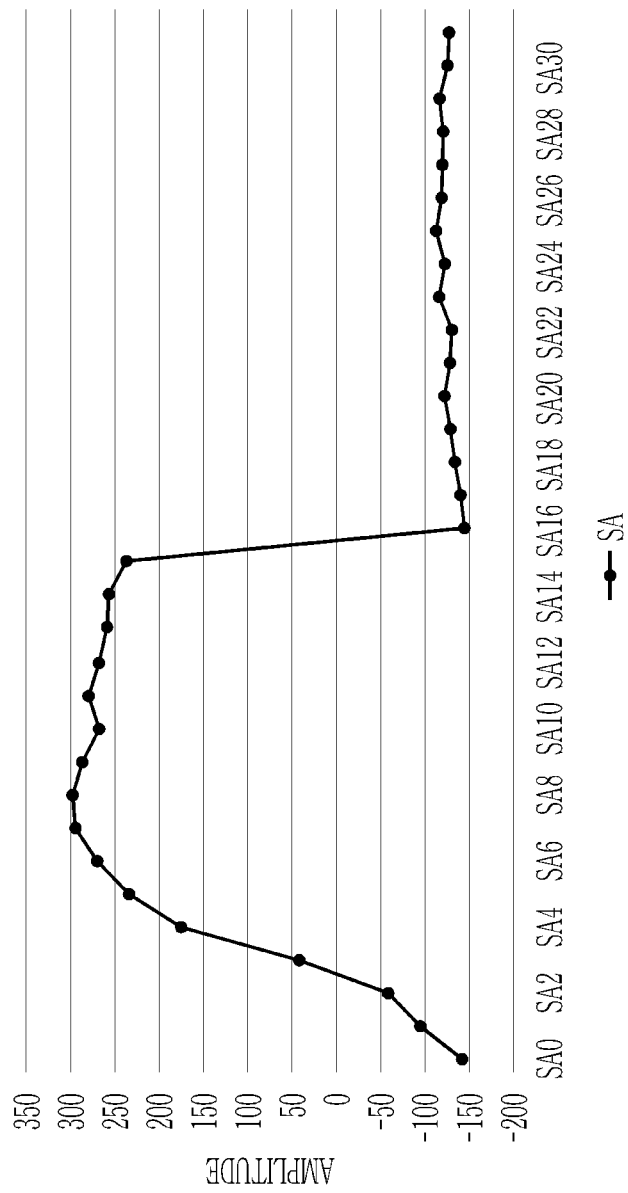

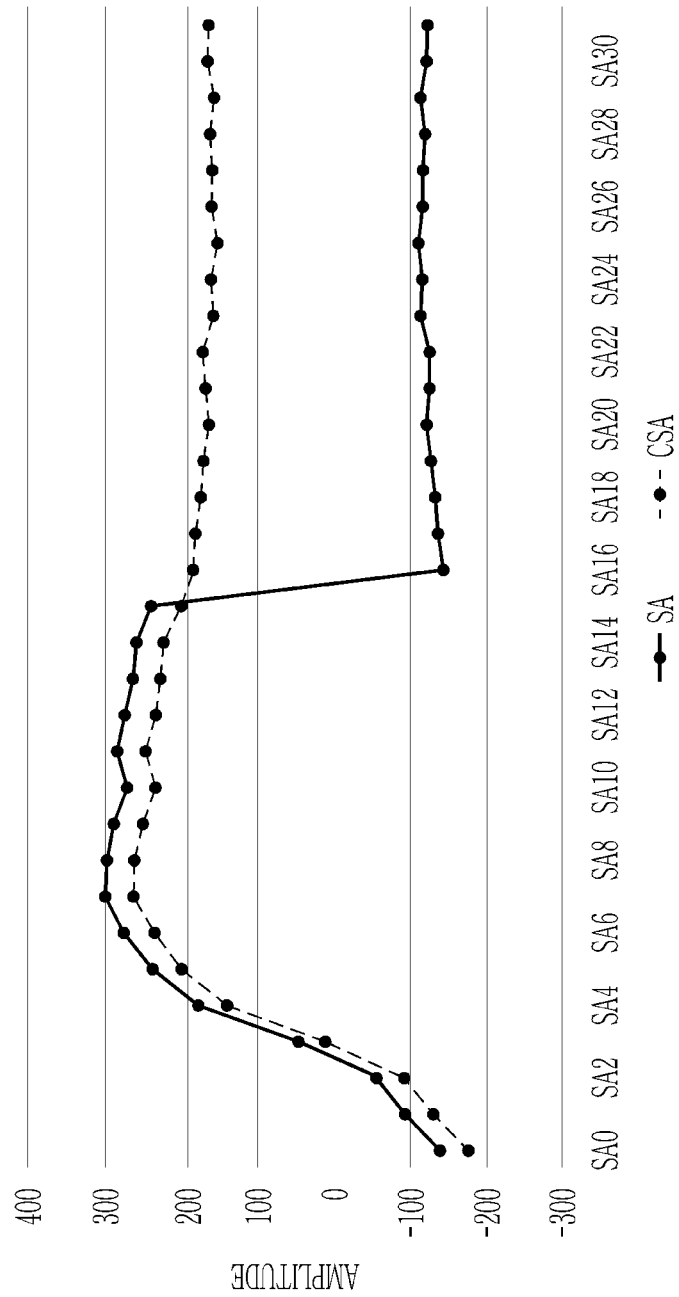

TOUCH DEVICE AND DRIVING METHOD FOR CORRECTING TOUCH ELECTRODE OUTPUT SIGNALS

CROSS-REFERENCE TO RELATED APPLICATION

This application claims priority to and the benefit of Korean Patent Application No. 10-2022-0068382 filed in the Korean Intellectual Property Office on Jun. 3, 2022 and Korean Patent Application No. 10-2022-0131771 filed in the Korean Intellectual Property Office on Oct. 13, 2022, the entire contents of which are incorporated herein by reference.

BACKGROUND

(1) Field

The present disclosure relates to a touch device and a driving method of the same.

(2) Description of the Related Art

Touch sensors may be provided in various electronic devices such as portable phones, smart phones, laptop computers, terminals for digital broadcasting, personal digital assistants (PDAs), portable multimedia players (PMPs), navigation, slate PCs, tablet PCs, ultrabooks, and wearable devices.

In such electronic devices, touch sensors may be positioned on display panels configured to display images, or may be positioned in some parts of the electronic devices. Users may touch the touch sensors for interaction with the electronic devices, whereby the electronic devices can provide intuitive user interfaces to the users.

Users may use stylus pens for delicate touch inputs. Stylus pens may be classified into active stylus pens and passive stylus pens depending on whether each stylus pen includes a battery and electronic components inside.

Active stylus pens are superior to passive stylus pens in basic performance, and have an advantage of being capable of providing additional functions (pen pressure, hovering, and buttons), but they are difficult to use during battery charging.

Passive stylus pens have the advantages of being more inexpensive than active stylus pens and not requiring batteries, but have the disadvantage of being less sensitive to delicate touches as compared to active stylus pens.

In particular, in the case of an electro-magnetic resonance (EMR) type of pen among passive stylus pens, a digitizer transfers an electromagnetic signal to the pen, and then the digitizer receives a resonance signal from the pen. In such digitizers, coils in which current can be induced by magnetic signals may be densely arranged so as to receive information on touches by pens. Such digitizers have the problem that they cannot keep pace with miniaturization and thinning of electronic devices and cannot be flexibly designed.

SUMMARY

An embodiment is to provide a touch device which can be implemented on one layer, and a driving method thereof.

An embodiment is to provide a touch device with improved performance for sensing touches by a stylus pen, and a driving method thereof.

A touch device according to an example embodiment includes a plurality of touch electrodes each of which has a first end and a second end, a plurality of first traces that is connected to the first ends of a plurality of first touch electrodes among the plurality of touch electrodes, a plurality of second traces that is connected to the second ends of a plurality of second touch electrodes among the plurality of touch electrodes, and a touch controller configured to correct the plurality of first output signals and/or the second output signals based on a first reference output signal of a first touch electrode adjacent to the plurality of second touch electrodes among a plurality of first output signals received through the plurality of first traces, and a second reference output signal of a second touch electrode adjacent to the plurality of first touch electrode among a plurality of second output signals received through the plurality of second traces.

The touch controller may identify at least one first output signal of the plurality of first output signal and at least one second output signal of the plurality of second output signals into two groups, and approximate each of the two groups by an n-th order function (wherein n is a positive number).

The touch controller may group n number of first output signals of the plurality of first output signals and second reference output signal into one group of the two groups, and group the first reference output signal and n number of second output signals of the plurality of second output signals into the other group of the two groups.

The touch controller may calculate coefficients of the two n-th order functions, and correct the plurality of first output signals and/or the second output signals using the two n-th order functions.

The touch controller may determine a touch position by calculating the difference between two of the plurality of corrected first output signals and/or the corrected second output signals.

A current in a first direction may be induced in some of the plurality of touch electrodes by a resonance circuit of a stylus pen adjacent to the plurality of touch electrodes, and a current in a second direction opposite to the first direction may be induced in another part of the touch electrodes among the plurality of touch electrodes.

When the directions of the current induced in two adjacent touch electrodes of the plurality of touch electrodes are different, the touch controller may determine the position between the two adjacent touch electrodes, as the position of the stylus pen.

A current in the same direction may be induced in a first touch electrode adjacent to the plurality of second touch electrodes and a second touch electrode adjacent to the plurality of first touch electrodes by the resonance circuit.

A touch device according to an example embodiment includes a plurality of touch electrodes, a plurality of first traces that is connected to a plurality of first touch electrodes of the plurality of touch electrodes, respectively, and extends in a first direction, a plurality of second traces that is connected to a plurality of second touch electrodes of the plurality of touch electrodes, respectively, and extends in a second direction opposite to the first direction, and a touch controller that uses a first reference output signal of a first touch electrode adjacent to the plurality of second touch electrodes among a plurality of first output signals received through the plurality of first traces, and a second reference output signal of a second touch electrode adjacent to the plurality of first touch electrode among a plurality of second output signals received through the plurality of second traces, to correct the plurality of first output signals and/or the second output signals.

The touch controller may identify at least one first output signal of the plurality of first output signal and at least one second output signal of the plurality of second output signals into two groups, and approximate each of the two groups as an n-th order function (wherein n is a positive number).

The touch controller may group n number of first output signals of the plurality of first output signals and second reference output signal into one group of the two groups, and group the first reference output signal and n number of second output signals of the plurality of second output signals into the other group of the two groups.

The touch controller may calculate coefficients of the two n-th order functions, and correct the plurality of first output signals and/or the second output signals using the two n-th order functions.

The touch controller may determine a touch position by calculating the difference between two of the plurality of corrected first output signals and/or the corrected second output signals.

A current in a first direction may be induced in some of the plurality of touch electrodes by a resonance circuit of a stylus pen adjacent to the plurality of touch electrodes, a current in a second direction opposite to the first direction may be induced in another part of the touch electrodes among the plurality of touch electrodes.

When the directions of the currents induced in two adjacent touch electrodes of the plurality of touch electrodes are different, the touch controller may determine the position between the two adjacent touch electrodes, as the position of the stylus pen.

Currents in the same direction may be induced in a first touch electrode adjacent to the plurality of second touch electrodes and a second touch electrode adjacent to the plurality of first touch electrodes by the resonance circuit.

By the resonance circuit, currents in the same direction may be induced in the plurality of first traces and the plurality of second traces.

A driving method of a touch device according to an example embodiment includes a step of receiving first output signals from a plurality of first traces connected to a plurality of first touch electrodes of a plurality of touch electrodes, respectively, and receiving second output signals from a plurality of second traces connected to a plurality of second touch electrodes of the plurality of touch electrodes, respectively, and a step of correcting the plurality of first output signals and/or the second output signals, using a first reference output signal of a first touch electrode adjacent to the plurality of second touch electrodes among the plurality of first output signals received through the plurality of first traces, and a second reference output signal of a second touch electrode adjacent to the plurality of first touch electrodes among the plurality of second output signals received through the plurality of second traces, and a step of determining a touch position using the plurality of corrected first output signals and/or the corrected second output signals.

The step of correcting the plurality of first output signals and/or the second output signals may include a step of identifying at least one first output signal of the plurality of first output signal and at least one second output signal of the plurality of second output signals into two groups, and a step of approximating each of the two groups by an n-th order function (wherein n is a positive number), and a step of calculating coefficients of the two n-th order functions, and a step of correcting the plurality of first output signals and/or the second output signals using the two n-th order functions.

The step of determining the touch position may include a step of determining the touch position by calculating the difference between two of the plurality of corrected first output signals and/or the corrected second output signals.

According to the example embodiments, there is an advantage of reducing the manufacturing cost of touch devices.

According to the example embodiments, there is an advantage that it is possible to provide a thinner and smaller form factor.

There is an advantage that it is possible to improve the signal-to-noise ratio (SNR) of a signal which is output from a stylus pen.

According to the example embodiments, there is an advantage that it is possible to improve the touch input receiving sensitivity According to the example embodiments, there is an advantage that it is possible to calculate a more accurate touch position.

According to the example embodiments, there is an advantage that it is possible to perform palm rejection.

BRIEF DESCRIPTION OF THE DRAWINGS

FIG. 5A and FIG. 5B are views illustrating stylus pens according to example embodiments.

FIG. 9A, FIG. 9B, FIG. 9C, and FIG. 9D are graphs illustrating output signals and difference data of a touch device according to an example embodiment.

DETAILED DESCRIPTION OF THE EMBODIMENTS

Figure 1A:
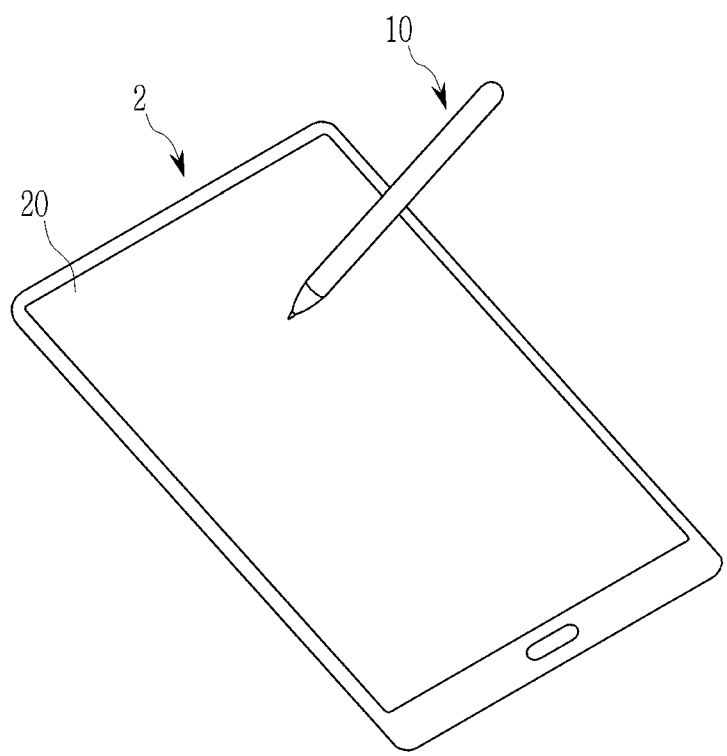
FIG. 1A and FIG. 1B are conceptual views illustrating stylus pens and electronic devices.

Hereinafter, various example embodiments in this specification will be described with reference to the accompanying drawings. However, it should be understood that there is no intent to limit the technology disclosed in this specification to specific example embodiments; rather, the present disclosure should be construed to cover various modifications, equivalents, and/or alternatives of the example embodiments disclosed in this specification. In describing the drawings, similar reference symbols may be used to designate similar constituent elements.

Further, the sizes and thicknesses of the individual constituent elements as shown in the drawings are randomly indicated for ease of explanation, and the present invention is not necessarily limited to the sizes and thicknesses as shown in the drawings. In the drawings, the thicknesses of layers, films, panels, regions, etc., are exaggerated for clarity. Further, in the drawings, for ease of explanation, the thicknesses of some layers, films, panels, regions, etc., are exaggerated.

Further, it will be understood that when an element such as a layer, film, region, or substrate is referred to as being "on" another element, it may be directly on the other element or intervening elements may also be present. In contrast, when an element is referred to as being "directly on" another element, there may be no intervening elements present. Further, when an element is "on" a reference portion, the element is located above or below the reference portion, and it does not necessarily mean that the element is located "above" or "on" in a direction opposite to gravity.

In this specification, the expression "have", "may have", "may include", or "can include refers to the existence of a corresponding feature (e.g., an element such as a numerical value, a function, an operation, or a constituent element), and does not exclude the existence of one or more additional features.

In this specification, the expression "A or B", "at least one of A or/and B", or "one or more of A or/and B" may include all possible combinations of items enumerated together. For example, the expression "A or B", "at least one of A and B", or "at least one of A or B" may refer to all of (1) including at least one A, (2) including at least one B, or (3) including all of at least one A and at least one B.

The expressions such as "first", "second" or the like used in this specification may modify various elements regardless of order and/or importance, and do not limit corresponding elements. The expressions may be used to distinguish an element from other elements. For example, a first user device and a second user device may indicate different user devices regardless of order and importance. As an example, a first element may be termed a second element, and similarly, a second element may be termed a first element, without departing from the scope of the present disclosure.

It will be construed that when one element (for example, a first element) is referred to as being "(operatively or communicatively) coupled with/to or connected to "another element (for example, a second element), the one element may be directly connected to another element or the one element may be indirectly connected to the other element via yet another element (for example, a third element). On the other hand, it will be construed that when one element (for example, a first element) is referred to as being "directly coupled" or "directly connected" to another element (for example, a second element), there is no intervening element (for example, a third element) between the one element and another element.

The expressions "configured to" used in this specification may be exchanged with, for example, "suitable for", having the capacity to", "designed to", "adapted to", "made to", or "capable of" according to the situation. The term "configured (set) to" may not necessarily imply only "specifically designed to" in hardware wise. In some situations, the expression "device configured to do something" may mean that the device "is able to do something" together with other devices or constituent elements. For example, the phrase "processor connected (set) to perform A, B, and C" may mean a dedicated processor (for example, an embedded processor) for performing the corresponding operations or a generic-purpose processor (for example, a CPU or an application processor) capable of performing the corresponding operations by executing one or more software programs stored in a memory device.

The terms used in this specification are merely for the purpose of describing specific example embodiments, and are not intended to limit the scope of other example embodiments. Singular forms may include plural forms as well unless the context clearly indicates otherwise. Terms used in this specification, including technical and scientific terms, may have the same meanings as those commonly understood by those skilled in the art to which the present disclosure pertains. Among terms used in this specification, such terms as those defined in a generally used dictionary are to be interpreted to have the meanings equal or similar to the contextual meanings in the relevant field of the art, and are not to be interpreted to have ideal or excessively formal meanings unless clearly defined in this specification. In some cases, even terms defined in this specification should not be interpreted to exclude the example embodiments disclosed in this specification.

Electronic devices according to various example embodiments in this specification may include at least one of, for example, smart phones, tablet personal computers (PCs), mobile phones, video phones, e-book readers, laptop personal computers (PCs), netbook computers, mobile medical appliances, cameras, or wearable devices. According to various example embodiments, wearable devices may include at least one of, for example, accessory-type devices (such as watches, rings, bracelets, anklets, necklaces, glasses, contact lenses, or head-mounted devices (HMDs)), fabric- or clothes-integrated devices (such as electronic clothes), body attaching-type devices (such as skin pads or tattoos), or body implantable devices (such as implantable circuits).

Hereinafter, touch devices according to example embodiments and driving methods thereof will be described with reference to necessary drawings.

Figure 1B:
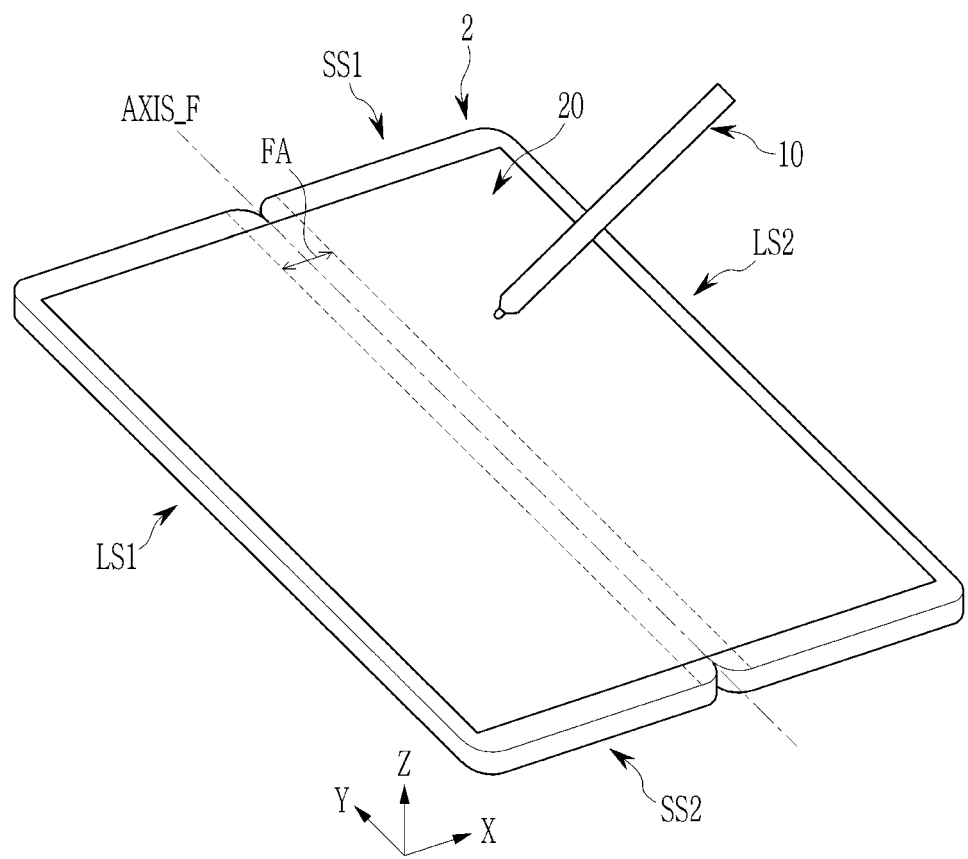

FIG. 1A and FIG. 1B are conceptual views illustrating stylus pens and electronic devices.

Referring to FIG. 1A, when a stylus pen 10 is near the touch screen 20 of the electronic device 2, the stylus pen 10 may receive a signal output from the electronic device 2 or the touch screen 20 and transmit a signal to the touch screen 20.

Referring to FIG. 1B, the electronic device 2 may be foldable. When a stylus pen 10 is near the touch screen 20 of the foldable electronic device 2, the stylus pen 10 may receive a signal output from the electronic device 2 or the touch screen 20, and transmit a signal to the touch screen 20.

In a member such as the rectangular foldable electronic device 2 or the touch screen 20 included in the rectangular foldable electronic device 2, a long side located on the left side on a plane may be referred to as a first long side LS1, a long side located on the right side may be referred to as a second long side LS2, a short side located on the upper side may be referred to as a first short side SS1, and a short side located on the lower side may be referred to as a second short side SS2.

The foldable electronic device 2 may be folded on a folding axis AXIS_F crossing the first short side SS1 and the second short side SS2, along a predetermined folding direction. In other words, the foldable electronic device 2 may be folded and unfolded on the folding axis AXIS_F, along the folding direction.

Figure 2A:
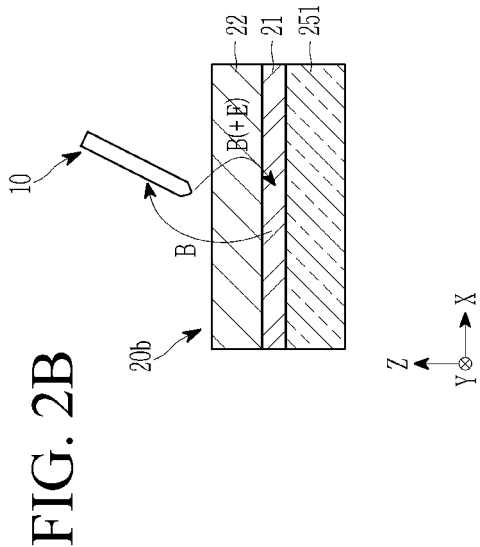
FIGS. 2A to 2D are provided for explaining signal transmission operations between stylus pens and electronic devices.

FIG. 2A to FIG. 2D are provided for explaining signal transmission operations between stylus pens and electronic devices. Referring to FIG. 2A, a touch screen 20a may include a digitizer 29, a display panel 251, a touch electrode layer 21, and a window 22.

In the case where a stylus pen 10a is an electro-magnetic resonance (EMR) pen of passive stylus pens, when the digitizer 29 transmits a magnetic signal B to the EMR stylus pen 10a, a resonance circuit included in the stylus pen 10a may resonate with the magnetic signal B. Then, the digitizer 29 receives the resonated magnetic signal B from the stylus pen 10a.

The digitizer 29 may be attached to the lower surface of the display panel 251, and may include a flexible printed circuit board (FPCB) that has a plurality of conductive antenna loops, and a ferrite sheet that blocks a magnetic field generated by the antenna loops and blocks eddy current which may be generated in other electrical elements and components when the antenna loops generate a magnetic field.

The FPCB may include a plurality of antenna loops formed in a plurality of layers so as to sense a position to which a resonance signal is input. One antenna loop has such a shape that it overlaps at least one other antenna loop in a Z-axis direction. Accordingly, the FPCB is thick. Therefore, when the digitizer 29 is used, there is difficulty in reducing the thickness and size of the electronic device 2.

In the case where such a digitizer 29 is mounted in a foldable/flexible electronic device 2, during folding, the FPCB attached to the folding area may be deformed. Repeated folding may cause stress to be applied to wiring members forming the antenna loops, resulting in damage to the wring members. The ferrite sheet may block the influence of a magnetic field, generated by the antenna loops, on the inside of the electronic device 2. The ferrite sheet may also be thick, and be likely to be deformed when the electronic device 2 is folded, and be damaged by repeated folding.

Figure 2B:
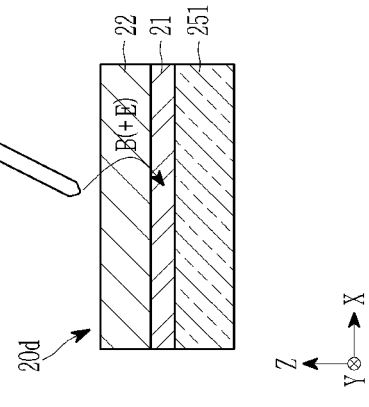

Referring to FIG. 2B, a touch screen 20b may include a display panel 251, a touch electrode layer 21, and a window 22.

In the case where a stylus pen 10 includes a resonance circuit, when an electrode of the touch electrode layer 21 transmits a magnetic signal B to the stylus pen 10, the resonance circuit included in the stylus pen 10 may resonate with the magnetic signal B. Then, the electrode of the touch electrode layer 21 may receive a resonated electromagnetic signal (E and/or B) from the stylus pen 10. When the electrodes of the touch electrode layer 21 are formed of low-resistance metal mesh, it may be possible to detect a magnetic signal from the stylus pen 10.

Similarly, as compared to the digitizer 29, since the touch screen does not require additional units or modules to transmit a magnetic signal to the stylus pen 10, the touch screen 20b can be thinned and has an advantage even in the manufacturing cost.

Figure 2C:
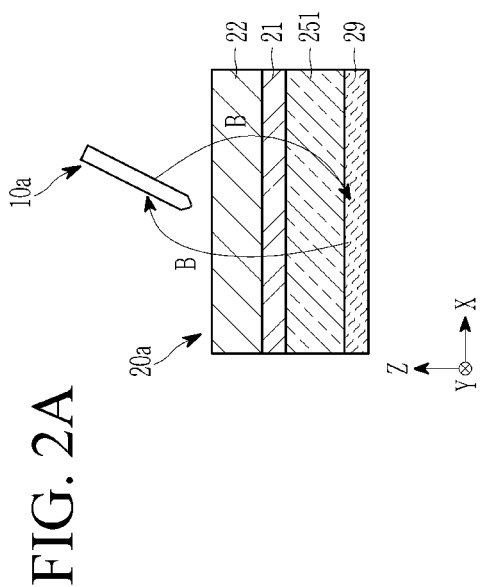

Referring to FIG. 2C, a touch screen 20b may include a loop coil 264, a display panel 251, a touch electrode layer 21, and a window 22.

In the case where a stylus pen 10 includes a resonance circuit, when the loop coil 264 transmits a magnetic signal B to the stylus pen 10, the resonance circuit included in the stylus pen 10 may resonate with the magnetic signal B. Then, an electrode of the touch electrode layer 21 may receive a resonated electromagnetic signal (E and/or B) from the stylus pen 10.

As compared to the digitizer 29, since the loop coil 264 does not receive a magnetic signal B to detect a touch position, the wiring structure is simple, so the touch screen 20c can be thinned. Accordingly, it is possible to reduce the thickness and size of the electronic device 2. Further, since the loop coil 264 may be formed in various positions in various sizes, such a touch screen 20c can be applied even to a foldable/flexible electronic device 2

The loop coil 264 may include a board on which antenna loops are located, and a ferrite sheet. The antenna loops may be formed of a conductive material such as copper, silver, etc. The antenna loops may be positioned in the same layer together with the touch electrode layer 21, besides a board. In this case, the antenna loops may be formed of a conductive material exhibiting high transmittance and low impedance, such as metal mesh, ITO, graphene, silver nanowires, etc. Further, the antenna loops may be positioned under the window. In this case, the loop coil 264 may not include a board.

In the above, the touch electrode layer 21 may include a plurality of first touch electrodes for detecting a touch coordinate in a first direction, and a plurality of second touch electrodes for detecting a touch coordinate in a second direction intersecting with the first direction. In FIGS. 2A to 2D, the touch electrode layer 21 is shown as one layer; however, the first touch electrodes and the second touch electrodes may be positioned in different layers, respectively, and may be positioned so as to overlap each other or so as not to overlap each other, and a separate layer may be interposed between the first touch electrodes and the second touch electrodes. However, the present disclosure is not limited thereto.

Figure 2D:
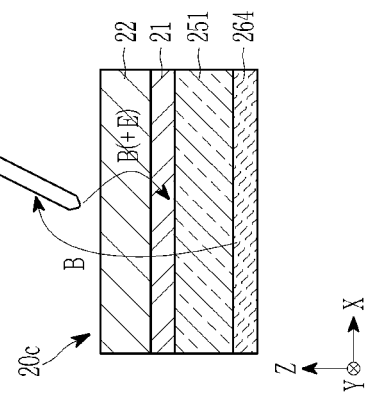

Referring to FIG. 2D, a touch screen 20d may include a display panel 251, a touch electrode layer 21, and a window 22.

In the case where an active stylus pen 10' includes a resonance circuit, the resonance circuit included in active stylus pen 10' may resonate using a power source provided in the active stylus pen 10' (for example, a battery for storing power (including a secondary battery) and a capacitor such as an electric double layered capacitor (EDLC)). Then, an electrode of the touch electrode layer 21 may receive a resonated electromagnetic signal (E and/or B) from the stylus pen 10'. When the electrodes of the touch electrode layer 21 are formed of low-resistance metal mesh, it may be possible to detect a magnetic signal from the stylus pen 10'. The active stylus pen 10' may include a circuit for outputting an electromagnetic signal (E and/or B) having a predetermined frequency using the power source, as well as the resonance circuit for generating an electromagnetic signal. Alternatively, the active stylus pen 10' may include both of the resonance circuit and the circuit for outputting an electromagnetic signal (E and/or B) having the predetermined frequency.

The touch screen 20d may receive an electromagnetic signal from the stylus pen 10' without transmitting a magnetic signal to the stylus pen 10'. In other words, since the touch screen 20d does not require additional units or modules for generating a signal to resonate the resonance circuit included in the stylus pen 10', the touch screen 20d can be made smaller and thinner, and has advantages even in power consumption and manufacturing cost.

Now, the structure of the touch screen 20b shown in (b) of FIG. 2 will be described in detail with reference to FIG. 3A to FIG. 3C.

Figure 3A:
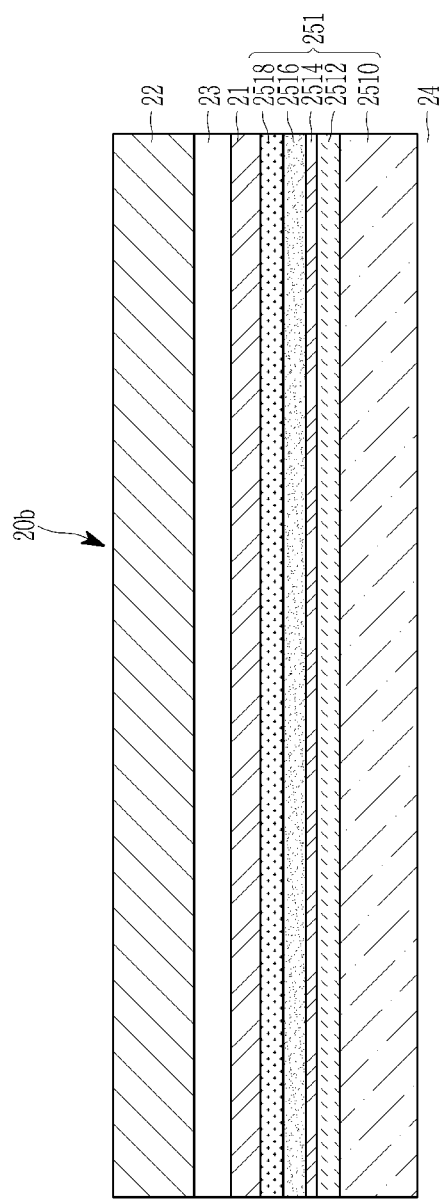
FIG. 3A is a view schematically illustrating a partial stack structure of the electronic device of FIG. 1A.

FIG. 3A is a view schematically illustrating a partial stack structure of the electronic device of FIG. 1A.

Referring to FIG. 3A, the display panel 251 may include a circuit drive layer 2512 disposed on a board 2510. The circuit drive layer 2512 may include a circuit for driving a light emitting layer 2514 of pixels for displaying an image. For example, the circuit drive layer 2512 may include a plurality of thin film transistors and capacitors.

On the circuit drive layer 2512, the light emitting layer 2514 may be disposed. The light emitting layer 2514 may include an organic light emitting layer. The light emitting layer 2514 may emit light with various degrees of luminance according to a driving signal transmitted from the circuit drive layer 2512.

On the light emitting layer 2514, a common electrode layer 2516 may be disposed. The common electrode layer 2516 may have at least one slit-shaped opening.

On the common electrode layer 2516, a sealing layer 2518 may be disposed. The sealing layer 2518 may include an inorganic film, or a laminated film of an inorganic film and an organic film. As another example, as the sealing layer 2518, glass, sealing film, and so on may be applied.

On the sealing layer 2518, the touch electrode layer 21, touch electrodes, or the like may be disposed. The touch electrode layer 21 may be a layer for sensing touch inputs and serve as a touch member. The touch electrode layer 21 may include a plurality of touch areas and touch electrodes.

On the touch electrode layer 21, a polarizing layer 23 may be disposed. The polarizing layer 23 may serve to reduce reflection of external light. The polarizing layer 23 may be attached to the touch electrode layer 21 with an adhesive layer interposed therebetween. The polarizing layer 23 may be omitted.

On the polarizing layer 23, a protective layer 22 may be disposed. The protective layer 22 may include, for example, a window member. The protective layer 22 may be attached to the polarizing layer 23 by an optical transparent adhesive or the like.

Below the display panel 251, a magnetic field shielding layer 24 may be disposed. The magnetic field shielding layer 24 may include a ferrite sheet for blocking a magnetic field. Besides, the magnetic field shielding layer 24 may contain ferrite powder adhered beneath the board 2510. The magnetic field shielding layer 24 may block eddy current which may be generated in other electrical elements and components when the touch electrode layer 21 and/or the stylus pen 10 generates a magnetic field.

Figure 3B:
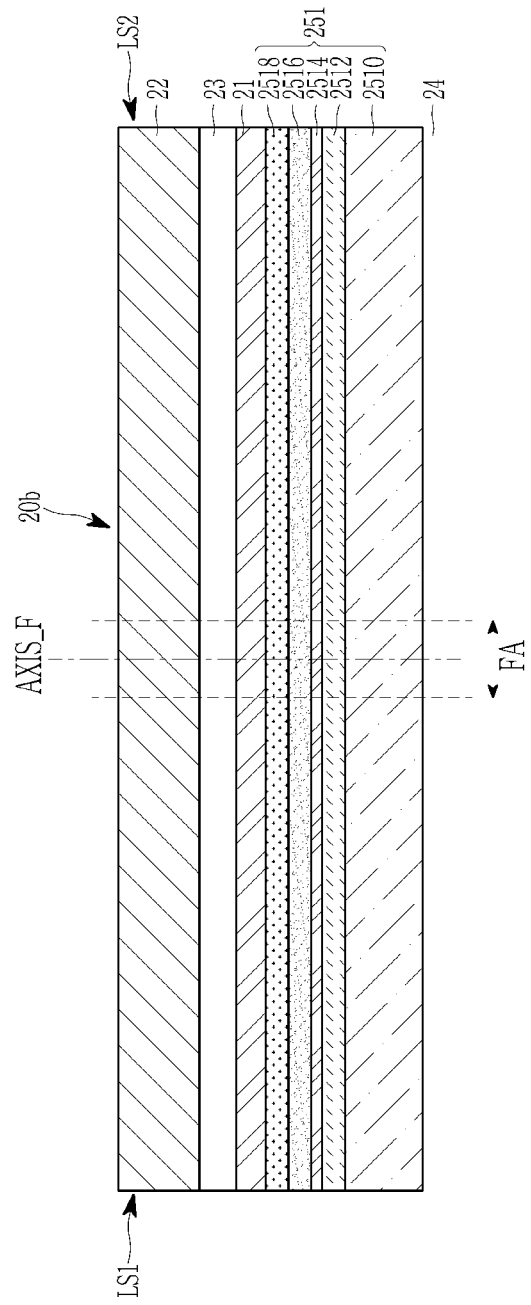
FIG. 3B and FIG. 3C are views schematically illustrating a partial stack structure of the electronic device of FIG. 1B.
Figure 3C:
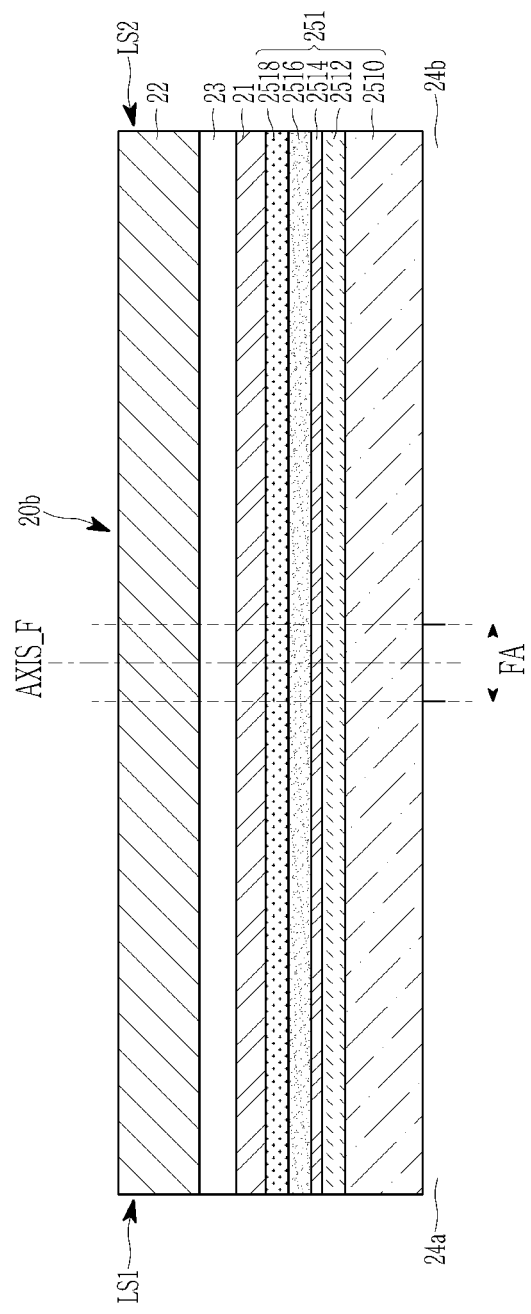

FIG. 3B and FIG. 3C are views schematically illustrating a partial stack structure of the electronic device of FIG. 1B.

The stack structure of FIG. 3B is the same as the stack structure of FIG. 3A, but a magnetic field shielding layer 24 may be positioned in an area (FA) which is folded when the foldable electronic device 2 is folded on the folding axis AXIS_F (hereinafter, referred to as the folding area).

As compared to the stack structure of FIG. 3B, in the stack structure of FIG. 3C, a magnetic field shielding layer 24 may be positioned except in a folding area FA or in an area included in the folding area FA. For example, the magnetic field shielding layer 24 may include a first sheet 24a positioned in an area between the folding area FA and the long side LS1, and a second sheet 24b positioned in an area between the folding area FA and the long side LS2. The magnetic field shielding layer 24 may include a plurality of sheets, besides two sheets. Even in this case, the magnetic field shielding layer 24 may be positioned on the back of the display panel 251 except for the folding area FA or except for a part of the folding area FA.

Now, the electronic device 2 according to example embodiments will be described with reference to FIG. 4.

Figure 4:
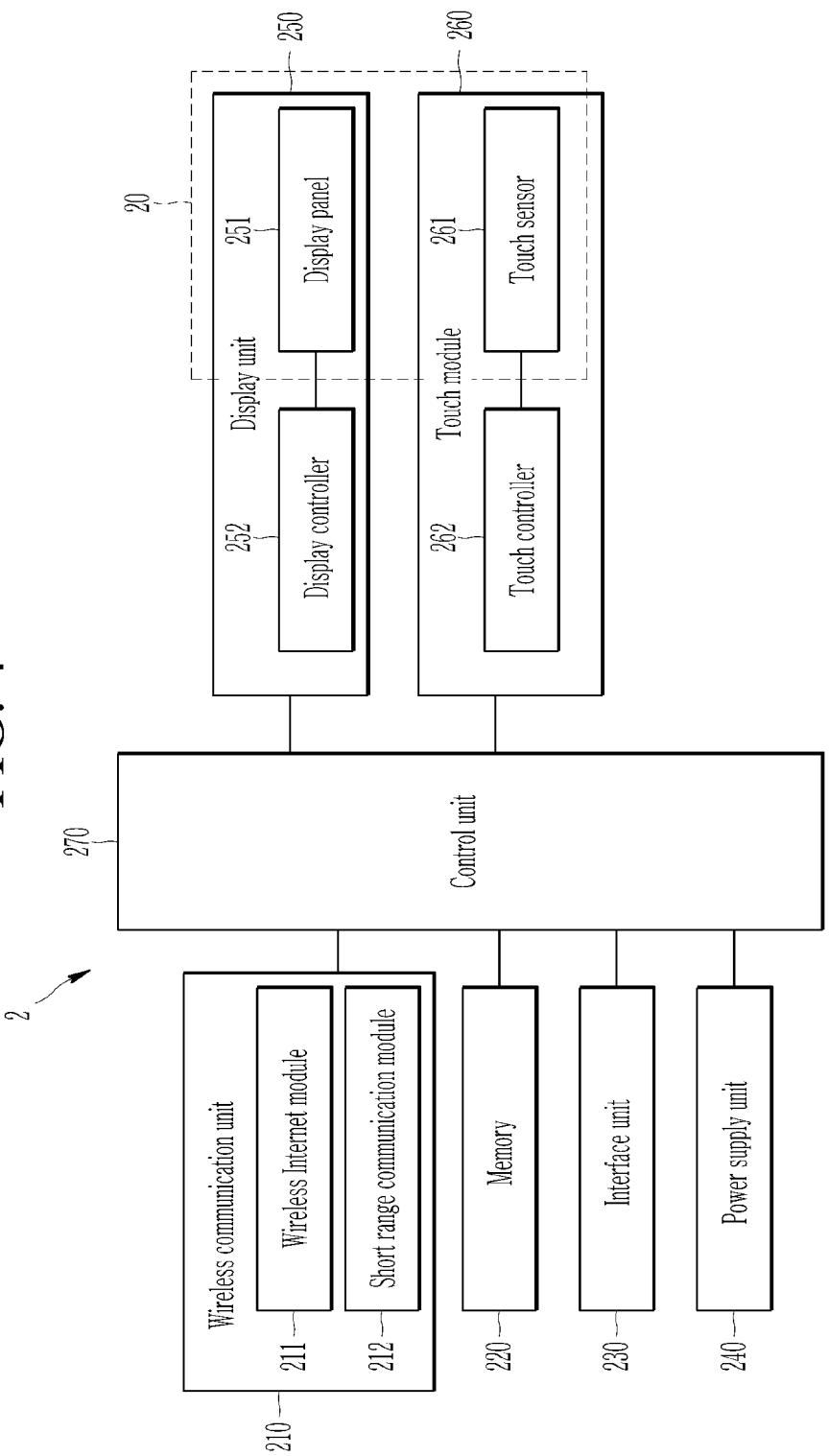
FIG. 4 is a block diagram schematically illustrating the electronic device.

FIG. 4 is a block diagram schematically illustrating the electronic device.

As shown in the drawing, the electronic device 2 may include a wireless communication unit 210, a memory 220, an interface unit 230, a power supply unit 240, a display unit 250, a touch module 260, a control unit 270, etc. The elements shown in FIG. 4 are not essential for implementing the electronic device, and the electronic device which is described herein may have more or less constituent elements than the above enumerated constituent elements.

More specifically, among the above-mentioned constituent elements, the wireless communication unit 210 may include one or more modules for enabling wireless communication between the electronic device 2 and wireless communication systems, between the electronic device 2 and other electronic devices 2, or between the electronic device 2 and external servers. Also, the wireless communication unit 210 may include one or more modules for connecting the electronic device 2 to one or more networks.

This wireless communication unit 210 may include a wireless Internet module 211, a short range communication module 212, etc.

The wireless internet module 211 refers to a module for wireless Internet access, and may be embedded in the electronic device 2. The wireless Internet module 211 may be configured to transmit and receive wireless signals in communication networks according to wireless Internet technologies. As examples of the wireless Internet technologies, there are WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), NR (New Radio), LTE (Long Term Evolution), LTE-A (Long Term Evolution-Advanced), etc., and the wireless Internet module 211 may be configured to transmit and receive data according to at least one wireless Internet technology within the range including Internet technologies not listed above.

The short range communication module 212 is for short range communication, and may support short range communication using at least one of Bluetooth, radio frequency identification (RFID), infrared data association (IrDA), ultra wideband (UWB), ZigBee, near field communication (NFC), Wi-Fi, Wi-Fi direct, and wireless universal serial bus (wireless USB) technologies. This short range communication module 212 may support wireless communication between the electronic device 2 and wireless communication systems, between the electronic device 2 and devices capable of wireless communication, or between the electronic device 2 and networks where external servers are located, via wireless area networks. The wireless area networks may be wireless personal area networks.

Here, the devices capable of wireless communication may be mobile terminals capable of exchanging data with (working in conjunction with) the electronic device 2 according to the present invention (for example, smart phones, tablet PCs, notebooks, etc.). The short range communication module 212 may detect (recognize) a device in the vicinity of the electronic device 2 which is capable of wireless communication with the electronic device 2. Further, when the detected device capable of wireless communication is a device authorized to perform communication with the electronic device 2 according to an example embodiment, the control unit 270 may transmit at least a part of data which is processed in the electronic device 2, to the device capable of wireless communication, via the short range communication module 212. Therefore, the user of the device capable of wireless communication can use the data which is processed in the electronic device 2, via the device capable of wireless communication.

In addition, the memory 220 may store data to support various functions of the electronic device 2. The memory 220 may store a number of application programs (or applications) which are run in the electronic device 2, data for the operation of the electronic device 2, and commands.

The interface unit 230 may serve as a passage through which the electronic device 2 is connected to various types of external devices. This interface unit 230 may include at least one of wired/wireless headset ports, wired/wireless data ports, external charger ports, memory card ports, ports for connecting devices equipped with identification modules, audio input/output (I/O) ports, video I/O ports, and earphone ports.

The power supply unit 240 may receive external power and internal power and supply power to the individual constituent elements included in the electronic device 2, under the control of the control unit 270. This power supply unit 240 may include a battery, and the battery may be a built-in battery or a replaceable battery.

The display unit 250 may display (output) information which is processed in the electronic device 2. For example, the display unit 250 may display information on the execution screen of an application program which is run in the electronic device 2, or UI (user interface) and GUI (graphic user interface) information according to the execution screen information.

The display unit 250 may include a liquid crystal display (LCD), an organic light-emitting diode (OLED) display, an e-ink display, a quantum-dot light-emitting display, a micro light emitting diode (LED) display, etc.

The display unit 250 may include a display panel 251 that displays images, and a display controller 252 that is connected to the display panel 251 and supplies signals for displaying image to the display panel 251. For example, the display panel 251 may include a plurality of pixels connected to signal lines such as a plurality of scan lines and a plurality of data lines, and a scan driver/receiver that supplies a scan signal to the scan lines, and the display controller 252 may include a data drive IC that generates a data signal to be applied to the data lines, a timing controller that controls the overall operation of the display unit 250 by processing image signals, a power management IC, etc.

The touch module 260 may sense a touch (or a touch input) applied to the touch area, using an electrostatic capacitance system. As an example, the touch module 260 may be configured to convert a change in electrostatic capacitance, voltage, current, etc., occurring in a specific part into an electrical input signal. The touch module 260 may be configured to detect the position and area on the touch module 260, touched by a touch object for applying a touch to the touch area, the electrostatic capacitance at the time of touch, etc. Here, the touch object is an object for applying touches to the touch sensor, and may be, for example, a user's body part (such as a finger, a palm, etc.), a passive or active stylus pen 10, etc.

The touch module 260 may include a touch sensor 261 in which touch electrodes are positioned, and a touch controller 262 that applies a driving signal to the touch sensor 261, and receives a detection signal from the touch sensor 261, and transmits touch data to the control unit 270 and/or the display controller 252.

The touch controller 262 may include a first driver/receiver that is connected to at least one of a plurality of first touch electrodes, and applies a driving signal, and receives a detection signal, a second driver/receiver that is connected to at least one of a plurality of second touch electrodes, and applies a driving signal, and receives a detection signal, a micro control unit (MCU) that controls the operations of the first driver/receiver and the second driver/receiver, and obtains a touch position using the detection signals output from the first and second driver/receivers.

The display panel 251 and the touch sensor 261 may form a layer structure together or be formed integrally with each other, which may also be referred to as a touch screen 20.

The control unit 270 may control driving of the electronic device 2, and output touch coordinate information in response to the touch detection result of the electronic device 2. Also, the control unit 270 may change the frequency of the driving signal in response to the touch detection result.

The control unit 270 may generally control the overall operation of the electronic device 2, besides the operation related to application programs. The control unit 270 may process signals, data, information, etc., input or to be output through the above-described constituent elements, or run application programs stored in the memory 220, thereby capable of providing or processing appropriate information or functions to the user.

Also, the control unit 270 may control at least a part of the constituent elements designated with reference to FIG. 4, in order to run application programs stored in the memory 220. Further, the control unit 270 may combine and operate at least two of the constituent elements included in the electronic device 2 in order to run the application programs.

Although the touch module 260 has been described above as being included in the electronic device 2 together with the display unit 250, the electronic device 2 may include only the touch module 260.

FIG. 5A and FIG. 5B are views illustrating stylus pens according to example embodiments.

The stylus pens in FIG. 5A and FIG. 5B may include resonance circuit units 12 in housings in common.

A resonance circuit unit 12 may be an LC resonance circuit, and resonate with a driving signal output from the touch screen 20. The driving signal may include a signal having a frequency corresponding to the resonant frequency of the resonance circuit unit 12 (for example, a sine-wave signal, a square-wave signal, etc.). For resonance, the resonant frequency of the resonance circuit unit 12 and the frequency of the driving signal may need to be the same or very similar. The resonant frequencies of stylus pens 10a and depend on the design values of the resonance circuit units 12 of the stylus pens 10a and 10b. When the touch electrode 21 in FIG. 2B or the loop coil 264 in FIG. 2C generates a magnetic field in response to a driving signal, the resonance circuit units 12 of the stylus pens 10a and 10b may resonate using a signal received through a change in the magnetic field.

The elements of the stylus pens 10a and 10b may be housed inside the housings. The housings may have a circular column shape, a polygonal column shape, the shape of a column in which at least a part has a curved surface, an entasis shape, the shape of a frustum of pyramid, the shape of a circular truncated cone, etc., but their shapes are not limited. The housings are hollow, so they can hold the elements of the stylus pens 10a and 10b such as the resonance circuit units 12 inside. These housings may be formed of a non-conductive material.

As shown in FIG. 5A, the EMR stylus pen 10a may include a core member 11a and the resonance circuit unit 12. The resonance circuit unit 12 may include an inductor unit 14 and a capacitor unit 13. The inductor unit 14 may include a ferrite core 115 through which the core member 11a passes, and a coil 116 wound around the outer surface of the ferrite core 115.

One end of the core member 11a may protrude from the ferrite core 115 so as to serve as the pen tip. The core member 11a may be configured with an electrode core made of a conductor, for example, a conductive metal or a rigid resin containing conductive powder.

The ferrite core 115 may be made of a ferrite material, for example, a cylindrical shape so as to have a through-hole extending in the axial direction and having a predetermined diameter (for example, 1 mm), through which the core member 11a can be inserted.

The coil 116 may be wound over the entire length of the ferrite core 115 in the axial direction, or may be wound over a portion of the length. The coil 116 may be electrically connected to the capacitor unit 13.

The capacitor unit 13 may include a plurality of capacitors connected in parallel. The individual capacitors on the printed board may have different capacitances, and be trimmed during the manufacturing process.

As shown in FIG. 5B, the ECR (electrically coupled resonance) stylus pen 10b may include a conductive tip 11b and the resonance circuit unit 12. The resonance circuit unit 12 may include an inductor unit 14 and a capacitor unit 13. The inductor unit 14 may include a ferrite core 115 and a coil 116 wound around the outer surface of the ferrite core 115.

The conductive tip 11b may have at least a part formed on a conductive material (such as a metal, conductive rubber, conductive fabric, conductive silicon, etc.), but is not limited thereto.

The coil 116 may be wound over the entire length of the ferrite core 115 in the axial direction, or may be wound over a portion of the length. The coil 116 may be electrically connected to the capacitor unit 13.

The capacitor unit 13 may include a plurality of capacitors connected in parallel. The individual capacitors on the printed board may have different capacitances, and be trimmed during the manufacturing process.

Hereinafter, a method of detecting a touch using a resonance signal received from a stylus pen described with reference to FIG. 5A and FIG. 5B will be described.

Figure 6:
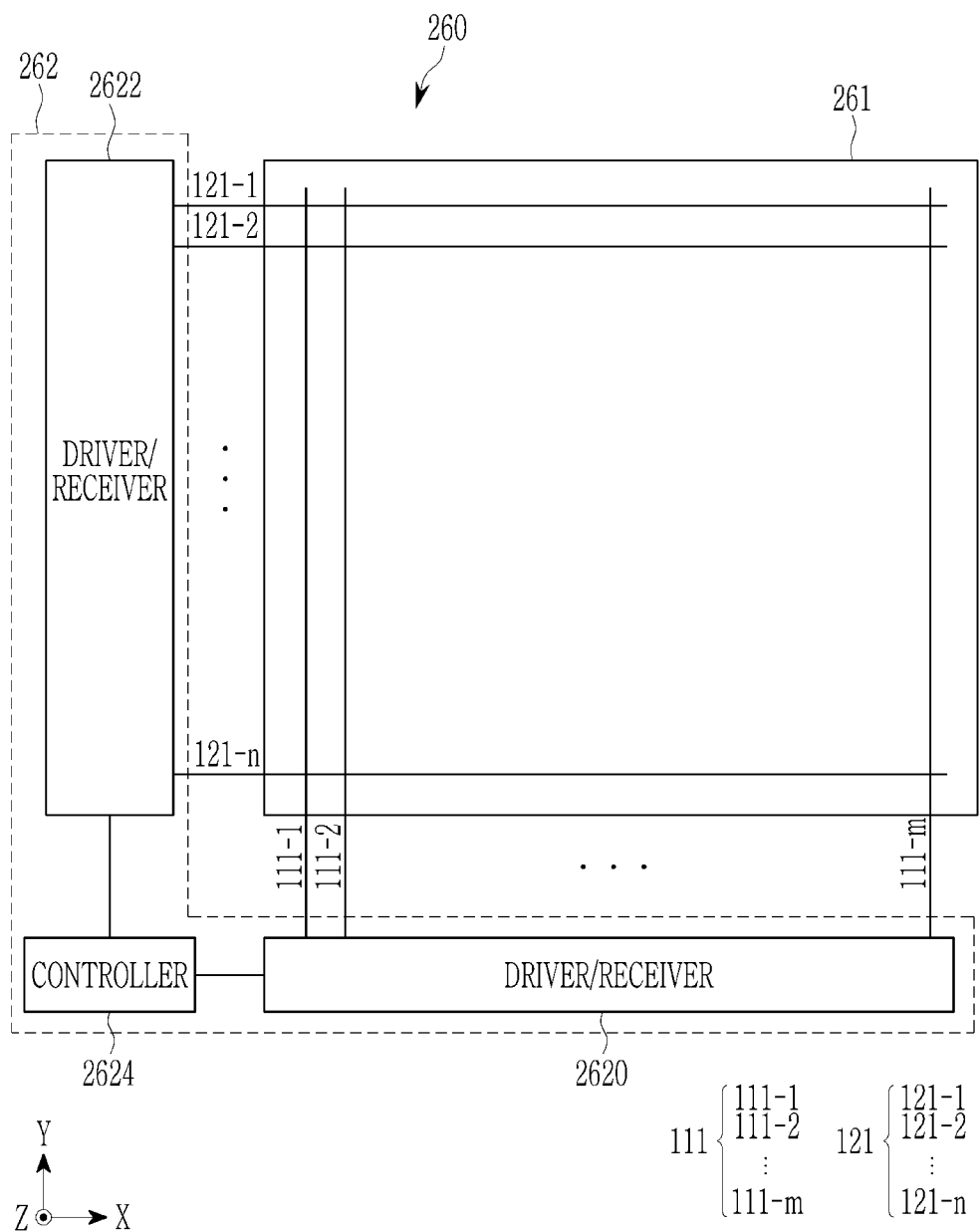
FIG. 6 is a view schematically illustrating a part of a touch device according to an example embodiment.

FIG. 6 is a view schematically illustrating a part of a touch device according to an example embodiment.

A touch module (i.e., a touch device) 260 according to an example embodiment may include a touch sensor 261, and a touch controller 262 for controlling the touch sensor 261. The touch controller 262 may include a first driver/receiver 2620 and a second driver/receiver 2622 for transmitting and receiving signals from and to the touch sensor 261, and a controller 2624.

The touch sensor 261 may include a plurality of first touch electrodes 111-1 to 111-m for detecting a touch coordinate in the first direction, and a plurality of second touch electrodes 121-1 to 121-n for detecting a touch coordinate in the second direction intersecting with the first direction. For example, the plurality of first touch electrodes 111-1 to 111-m may have a shape extending in the second direction, and the plurality of second touch electrodes 121-1 to 121-n may have a shape extending in the first direction. In the touch sensor 261, the plurality of first touch electrodes 111-1 to 111-m may be arranged along the first direction, and the plurality of second touch electrodes 121-1 to 121-n may be arranged along the second direction.

The first driver/receiver 2620 may apply a driving signal to the plurality of first touch electrodes 111-1 to 111-m. The second driver/receiver 2622 may receive a detection signal from the plurality of second touch electrodes 121-1 to 121-n.

Although the touch sensor 261 has been described above as being implemented in a mutual capacitance type, the touch sensor 261 may be implemented in a self-capacitance type, and it will be easy for those skilled in the art to change the touch sensor so as to be suitable for the self capacitance manner by appropriately modifying the touch electrodes 111-1 to 111m and 121-1 to 121-n, the first driver/receiver 2620, and the second driver/receiver 2622 of the mutual capacitance type, or adding new components, or omitting some constituent elements.

In other words, the touch sensor 261 may include a plurality of touch electrodes of a self capacitance type, and in this case, the touch electrodes may be arranged in the form of dots, or may be arranged in the form extending in one direction as described above.

Now, electrodes and traces will be described with reference to FIG. 7.

Figure 7:
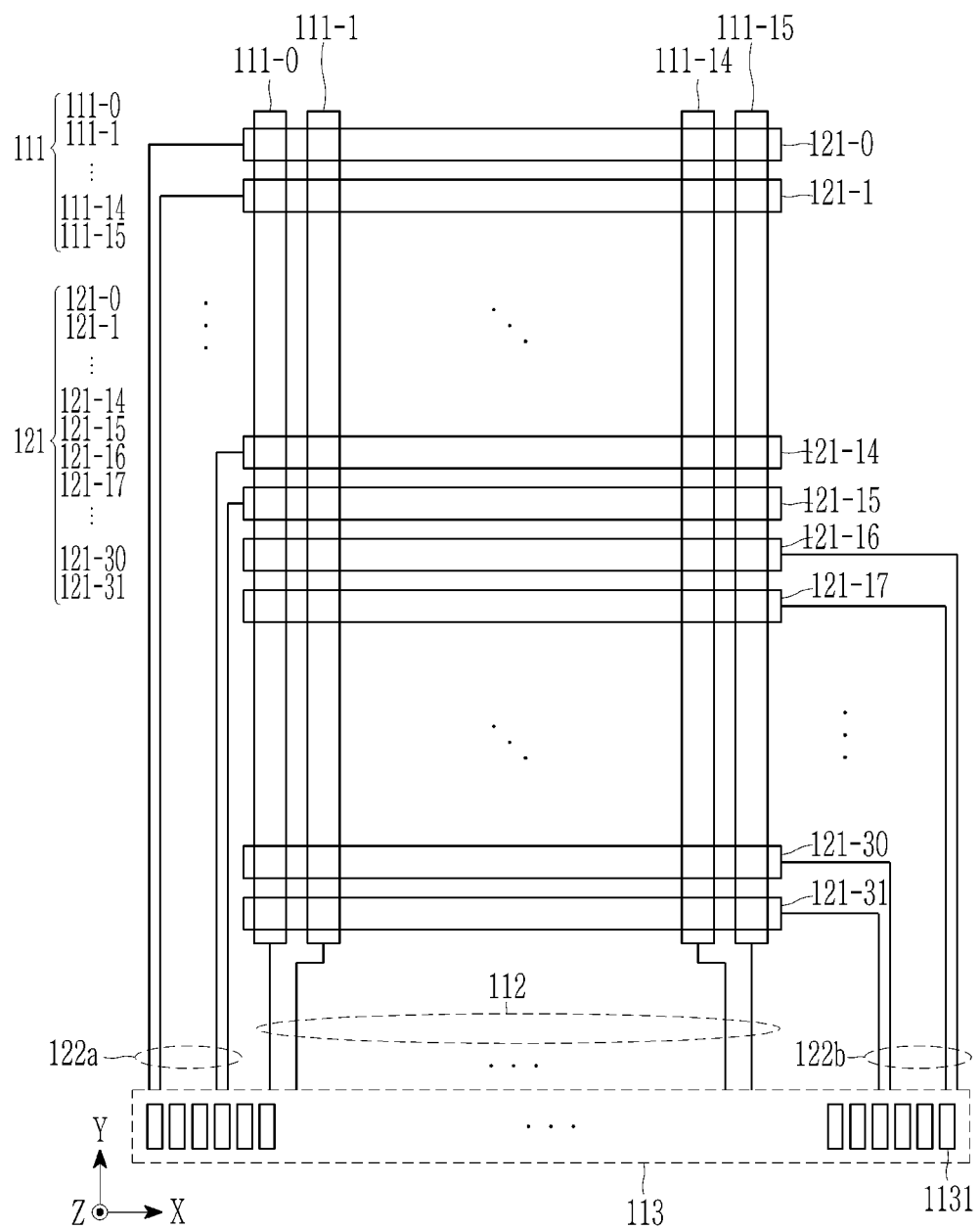
FIG. 7 is a view illustrating an example of an arrangement of electrodes and traces of a touch device according to an example embodiment.

FIG. 7 is a view illustrating an example of an arrangement of electrodes and traces of a touch device according to an example embodiment.

Touch electrodes 111 and 121 in a touch sensor may be connected to a plurality of pads 1131 through traces 112, 122a, and 122b in the peripheral area located around a touch area. The plurality of pads 1131 may be positioned in a pad area 113. First touch electrodes 111-0 to 111-15 may be connected to the traces 112, respectively, and second touch electrodes 121-0 to 121-31 may be connected to the traces 122a and 122b, respectively.

The touch electrodes 111 and 121 and the traces 112, 122a, and 122b may be formed in the same layer. The touch electrodes 111 and 121 and the traces 112, 122a, and 122b may be formed of a conductive material exhibiting high transmittance and low impedance, such as metal mesh and silver nanowires. Alternatively, the touch electrodes 111 and 121 and the traces 112, 122a, and 122b may be positioned in different layers, and may be made of ITO or graphene, but are not limited thereto.

The pads 1131 may be connected to the touch controller 262, and transmit a signal received from the touch controller 262 (for example, a driving signal) to the touch electrodes 111 and 121, and transmit a signal received from the touch electrodes 111 and 121 (for example, a detection signal) to the touch controller 262.

Although it has been described with reference to FIG. 7 that the number of first touch electrodes 111 is 16 and the number of second touch electrodes 121 is 32, the numbers of first touch electrodes 111 and second touch electrodes 121 are not limited thereto. The following description will be made on the assumption that the number of first touch electrodes 111 is 16 and the number of second touch electrodes 121 is 32.

Now, the operation of the second driver/receiver 2622 when the second driver/receiver receives a detection signal from a touch electrode 121 will be described with reference to FIG. 8A, FIG. 8B, FIG. 9A, FIG. 9B, FIG. 9C, and FIG. 9D.

Figure 8A:
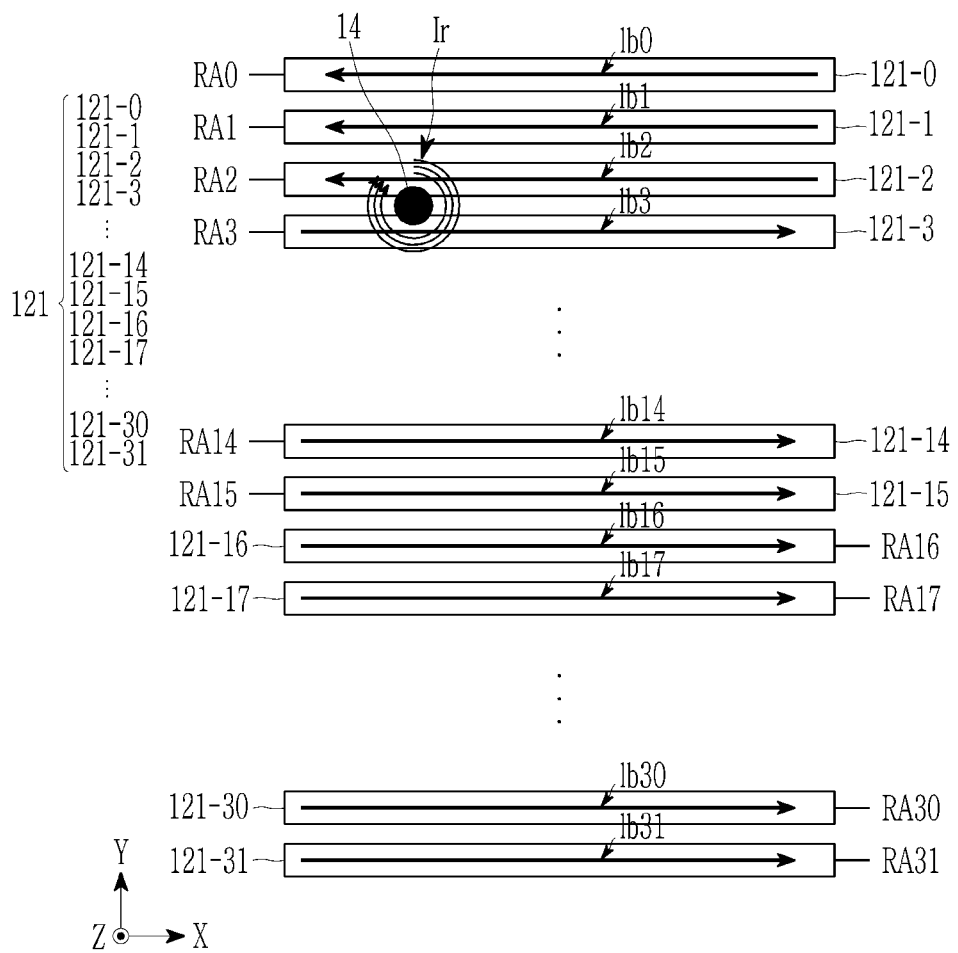
FIG. 8A is a view illustrating a first electrode of a touch device according to an example embodiment.
Figure 8B:
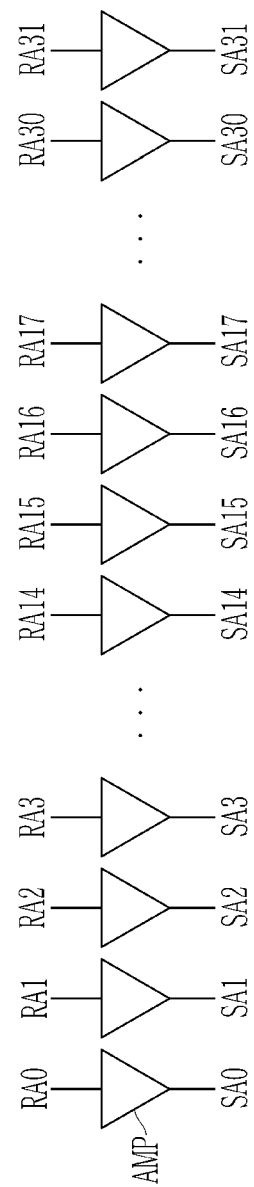
FIG. 8B is a view illustrating a receiver of the touch device according to the example embodiment.

FIG. 8A is a view illustrating a first electrode of a touch device according to an example embodiment, and FIG. 8B is a view illustrating a receiver of the touch device according to the example embodiment, and FIG. 9A, FIG. 9B, FIG. 9C, and FIG. 9D are graphs illustrating output signals and difference data of a touch device according to an example embodiment.

Referring to FIG. 8A, the inductor unit 14 of the stylus pen 10a or 10b may be positioned on the touch screen 20 between two adjacent second touch electrodes 121-2 and 121-3.

In an example embodiment, first ends of the second touch electrodes 121-0 to 121-15 (ends oriented to the negative direction of an X axis) may be connected to corresponding first traces RA0 to RA15. In this case, second ends of the second touch electrodes 121-0 to 121-15 (ends oriented to the positive direction of the X axis) may be open. The second ends of the second touch electrodes 121-16 to 121-31 may be connected to second traces RA16 to RA31. In this case, first ends of the second touch electrodes 121-16 to 121-31 may be open.

In some example embodiments, the stylus pen 10a or 10b may be resonated by a driving signal applied to a touch electrode (for example, the reference symbol "121" or the reference symbol "111" in FIG. 7) having two signal input terminals. This resonance may cause a current Ir to flow in the coil of the inductor unit 14. This current Ir may cause eddy current in the touch electrodes 121. These eddy current may be generated in the opposite direction to the direction of the current Ir.

For example, in the second touch electrodes 121-0, 121-1, and 121-2 positioned on the upper side of the inductor unit 14 (the positive direction of an Y axis), current Ib0, Ib1, and Ib2 may be generated in the negative direction of the X axis, and in the second touch electrodes 121-3 to 121-31 positioned on the lower side of the inductor unit 14 (the negative direction of the Y axis), current Ib3 to Ib31 may be generated in the positive direction of the X axis. In other words, the direction of the current Ib0, Ib1, and Ib2 induced in the second touch electrodes 121-0, 121-1, and 121-2 and the direction of the current Ib3 to Ib31 induced in the second touch electrodes 121-3 to 121-31 may be opposite to each other.

As for the directions of current between the second touch electrodes 121-0 to 121-31 and the traces RA0 to RA31 at a point in time, the current Ib0, Ib1, and Ib2 may flow from the second touch electrodes 121-0, 121-1, and 121-2 into the first traces RA0, RA1, and RA2, and the current Ib3 to Ib15 may flow from the first traces RA3 to RA15 into the second touch electrodes 121-3 to 121-15, and the current Ib16 to Ib31 may flow from the second touch electrodes 121-16 to 121-31 into the second traces RA16 to RA31.

Referring to FIG. 8B, the second driver/receiver 2622 may include a plurality of amplifiers AMP. Each amplifier AMP may be a single ended amplifier. Each amplifier AMP may have one input terminal and one output terminal. The plurality of traces RA0 to RA31 may be connected to the input terminals of corresponding amplifiers AMP, respectively. The output signals SA0 to SA31 of the individual amplifiers AMP may be transmitted to the controller (the reference symbol "2624" in FIG. 6). The controller 2624 may receive the output signals SA0 to SA31, and determine the touch point.

Figure 9B:
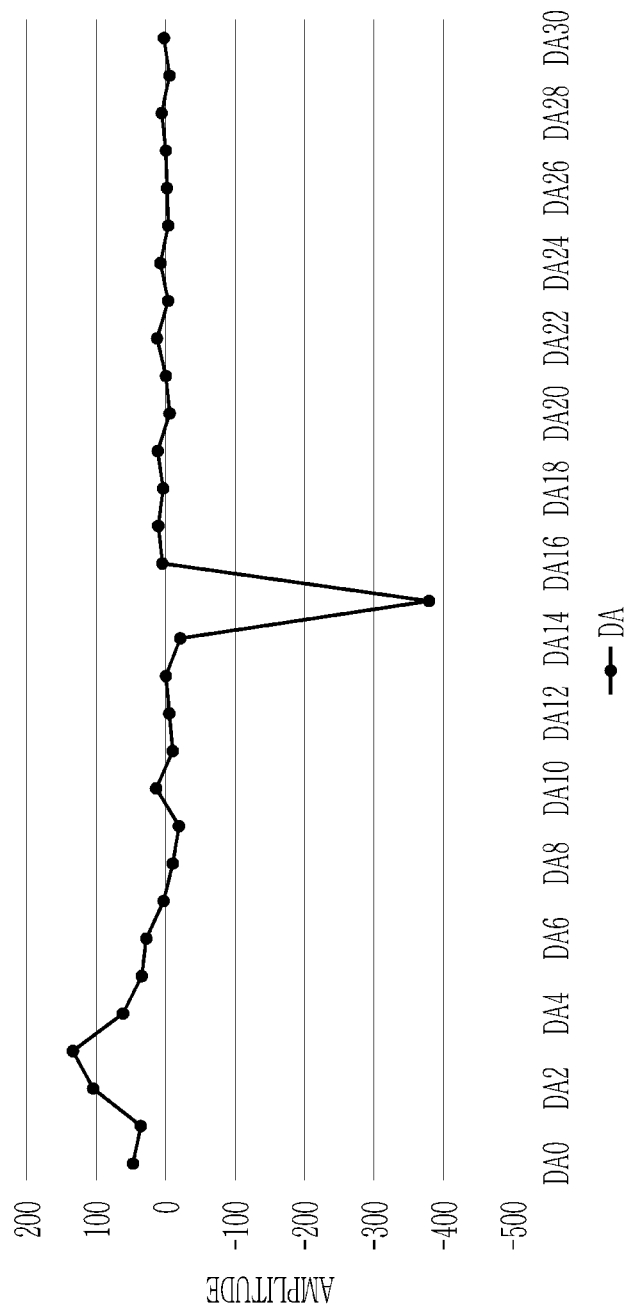

A method of determining a touch point will be described with reference to FIG. 9A and FIG. 9B. As shown in FIG. 9A, the output signals SA may be expressed as voltages. In FIG. 8A, the inductor unit 14 is positioned between the second touch electrode 121-2 and the second touch electrode 121-3, so the output signal SA2 and the output signal SA3 may have values closer to zero than the other output signals SA0, SA1, and SA4 to SA31. A current may flow into the first trace RA2 connected to the second touch electrode 121-2, and a current may flow out from the first trace RA3 connected to the second touch electrode 121-3. Therefore, the sign of the output signal SA2 and the sign of the output signal SA3 may be different.

The touch controller (the reference symbol "2624" in FIG. 6) may determine the touch position, using the differences between the output signals SA0 to SA31. FIG. 9B shows difference data items DA on the differences between the output signals from two adjacent touch electrodes in the arrangement direction among the output signals SA0 to SA31. The touch controller 2624 may generate the difference data items by converting the output signals SA0 to SA31 to digital data items by an analog-to-digital converter (ADC), etc. The touch controller 2624 may determine the touch position using the difference data items DA0 to DA30 by a touch position calculation method such as a center-of-gravity method. When the touch position is determined using the difference data items DA0 to DA30, the touch position may be calculated as a position between two of the second touch electrodes 121-0 to 121-31, which output two output signals to be the base of a difference data item, by the center-of-gravity method. In other words, the center-of-gravity method may determine the touch position by calculating the product of the amplitude of a signal and the position at which the corresponding signal was detected, as the center of gravity; however, since the positions at which the difference data items DA0 to DA30 were detected are not actual, the position between two second touch electrodes which output two output signals to be the base of one of the difference data items DA0 to DA30 may be determined as the touch position by the center-of-gravity method.

In an example embodiment, when the second driver/receiver 2622 includes a plurality of differential amplifiers, and each differential amplifier outputs a difference signal between two second touch electrodes, the touch controller 2624 may determine the touch position using the difference signal output from the differential amplifier, without calculating a separate difference data item.

Since it is difficult to apply the center-of-gravity method to the output signals SA0 to SA31 in FIG. 9A, the touch controller 2624 may calculate the difference data items DA0 to DA30 as shown in FIG. 9B, using the output signals SA0 to SA31, and determine the touch position using the values of the difference data items DA0 to DA30.

Meanwhile, a specific difference data item may be generated using output signals output from two traces in opposite directions, which are connected to two second touch electrodes in which current flows in the same direction, respectively. For example, the difference data item DA15 may be generated by the output signal SA15 output from the first trace RA15 connected to the first end of the second touch electrode 121-15 (the end oriented to the negative direction of the X axis) and the output signal SA16 output from the second trace RA16 connected to the second end of the second touch electrode 121-16 (the end oriented to the positive direction of the X axis)

In the second touch electrode 121-15 and the second touch electrode 121-16, the current Ib15 and Ib16 may flow in the same direction (the positive direction of the X axis). Accordingly, since the current Ib15 and Ib16 flows in the second touch electrode 121-15 and the second touch electrode 121-16 in the same direction (the positive direction of the X axis), but the connection directions of the traces RA15 and RA16 for transmitting the current to the second driver/receiver 2622 are opposite to each other, the output signals SA15 and SA16 having different signs may be input to an amplifier AMP of the second driver/receiver 2622. The difference data item DA15 based on the difference between the output signals SA15 and SA16 having different signs may have a larger value than the other difference data items DA0 to DA14 and DA16 to DA30. Therefore, although a touch by the stylus pen 10*a* or 10*b* has not actually occurred, the controller 2624 may determine that a touch has occurred between the second touch electrode 121-15 and the second touch electrode 121-16 connected to the traces RA15 and RA16.

In an example embodiment, the touch controller 2624 may correct the output signals SA16 to SA31 transmitted from the second touch electrodes 121-16 to 121-31 different from the second touch electrodes 121-0 to 121-15 in the connection directions of the traces, using the difference data items DA0 to DA30. In some example embodiments, the touch controller 2624 may correct the output signals SA0 to SA15 transmitted from the second touch electrodes 121-0 to 121-15 different from the second touch electrodes 121-16 to 121-31 in the connection directions of the traces.

In an example embodiment, the touch controller 2624 may correct the output signals SA0 to SA31, using the output signals SA15 and SA16 transmitted from two second touch electrodes 121-15 and 121-16 different from each other in the connection directions of the traces.

First of all, the difference data items DA0 to DA14 may be expressed as the following Equation 1.

$$DA_i = SA_{i+1} - SA_i (0 \leq i \leq 14) \quad \text{(Equation 1)}$$

The difference data item DA15 may be expressed as the following Equation 2.

$$DA_i = -SA_{i+1} - SA_i (i=15) \quad \text{(Equation 2)}$$

The difference data items DA 16 to DA30 may be expressed as the following Equation 3.

$$DA_i = -SA_{i+1} - (-SA_i)(16 \leq i \leq 30) \quad \text{(Equation 3)}$$

The above Equations 1 to 3 may be rearranged in terms of SAi as the following Equations 4 to 6.

$$SA_i = c (i=0) \quad \text{(Equation 4)}$$

$$SA_i = c + \Sigma_{j=0}^{i+1} DA_j (1 \leq i \leq 15) \quad \text{(Equation 5)}$$

$$SA_i = -(c + \Sigma_{j=0}^{i+1} DA_j)(16 \leq i \leq 31) \quad \text{(Equation 6)}$$

In the case of $\Sigma_{j=0}^{i+1} DAj = DSAl$, Equations 5 and 6 may be rearranged as follow.

$$SA_i = C + DSAl (1 \leq i \leq 15) \quad \text{(Equation 7)}$$

$$SA_i = -(C + DSAl)(16 \leq i \leq 31) \quad \text{(Equation 8)}$$

The touch controller 2624 may correct the output signals SA0 to SA31, using the output signals SA15 and SA16 transmitted from the second touch electrodes 121-15 and 121-16 different from each other in the connection directions of the traces, and the output signals SA13, SA14, SA17, and SA18 transmitted from the second touch electrodes 121-13, 121-14, 121-17, and 121-18 adjacent to the second touch electrodes 121-15 and 121-16. For example, the touch controller 2624 may correct the touch signals SA13 to SA18 related to the second touch electrodes 121-13 to 121-18 by grouping the plurality of output signals SA13 to SA18 into two groups and approximating each group by an n-th order function and calculating the coefficients of the two n-th order functions. In this case, one group may include (n+1) number of output signals. Hereinafter, in the case of n=3, one group may include four output signals SA13 to SA16, and the other group may include four output signals SA15 to SA18. Then, the touch controller 2624 may approximate the output signals SA13 to SA16 by a cubic function, and approximate the output signals SA15 to SA18 by a cubic function. Hereinafter, a method of calculating the touch signals SA6 to SA11 related to the second touch electrodes 121-13 to 121-18 will be described. The output signals SA13 to SA16 and the output signals SA15 to SA18 may be approximated by cubic functions as expressed in the following Equations 9 and 10.

$$YL(x) = mx3 + nx2 + jx + k(x=-1,0,1,2) \quad \text{(Equation 9)}$$

$$YR(x) = ax3 + bx2 + cx + d(x=-1,0,1,2) \quad \text{(Equation 10)}$$

In Equation 9, x values may correspond to the positions of the second touch electrodes 121-13 to 121-16, and y values may be expressed as SA13 to SA16. In Equation 10, x values may correspond to the positions of the second touch electrodes 121-15 to 121-18, and y values may be expressed as SA15 to SA18.

When Equation 9 is rearranged, the coefficients may be simplified as shown in the following Equation 11.

$$m = -\frac{SA13}{6} + \frac{SA14}{2} - \frac{SA15}{2} + \frac{SA16}{6} \quad \text{(Equation 11)}$$

$$n = \frac{SA13}{2} - SA14 + \frac{SA15}{2}$$

$$j = -\frac{SA13}{3} - \frac{SA14}{2} + SA15 - \frac{SA16}{6}$$

$$k = SA14$$

When Equation 10 is rearranged, the coefficients may be simplified as shown in the following Equation 12.

$$a = -\frac{SA15}{6} + \frac{SA16}{2} - \frac{SA17}{2} + \frac{SA18}{6} \quad \text{(Equation 12)}$$

$$b = \frac{SA15}{2} - SA16 + \frac{SA17}{2}$$

$$c = -\frac{SA15}{3} - \frac{SA16}{2} + SA17 - \frac{SA18}{6}$$

$$d = SA16$$

Equations 11 and 12 may be rearranged as the following Equations 13 and 14.

$$m = -\frac{C}{3} - \frac{DSA16}{6} - \frac{DSA15}{2} + \frac{DSA14}{2} - \frac{SA13}{6} \quad \text{(Equation 13)}$$

$$n = \frac{DSA15}{2} - DSA14 + \frac{DSA13}{2}$$

$$j = \frac{C}{3} + \frac{DSA16}{6} + DSA15 - \frac{DSA14}{2} - \frac{SA13}{3}$$

$$k = C + DSA14$$

$$a = -\frac{C}{3} - \frac{DSA18}{6} + \frac{DSA17}{2} - \frac{DSA16}{2} - \frac{SA15}{6} \quad \text{(Equation 14)}$$

$$b = C - \frac{DSA17}{2} + DSA16 + \frac{DSA15}{2}$$

-continued $$c = -\frac{2C}{3} + \frac{DSA18}{6} - DSA17 + \frac{DSA16}{2} - \frac{DSA15}{3}$$

$$d = -C - DSA16$$

When the coefficients in Equations 9 and 10 are simplified as expressed in Equations 13 and 14 by substituting Equations 7 and 8 into Equations 9 and 10, respectively, such a value for C that the value which is obtained by substituting 1.5 for x in Equation 9 (i.e., the value of YL(x) corresponding to the output signal value between the second touch electrode 121-15 and the second touch electrode 121-16) is equal to the value which is obtained by substituting −0.5 for x in Equation 10 (i.e., the value of YR(x) corresponding to the output signal value between the second touch electrode 121-15 and the second touch electrode 121-16) may be calculated as in the following Equation 15.

$$C = \frac{DSA16 - 5DSA17 + 10DSA16 - 10DSA15 + 5DSA14 - DSA13}{6} \quad \text{(Equation 15)}$$

If the value of C is calculated, the touch controller 2624 may calculate correction values for the output signals SA0 to SA31, using Equations 7 and 8.

Figure 9D:
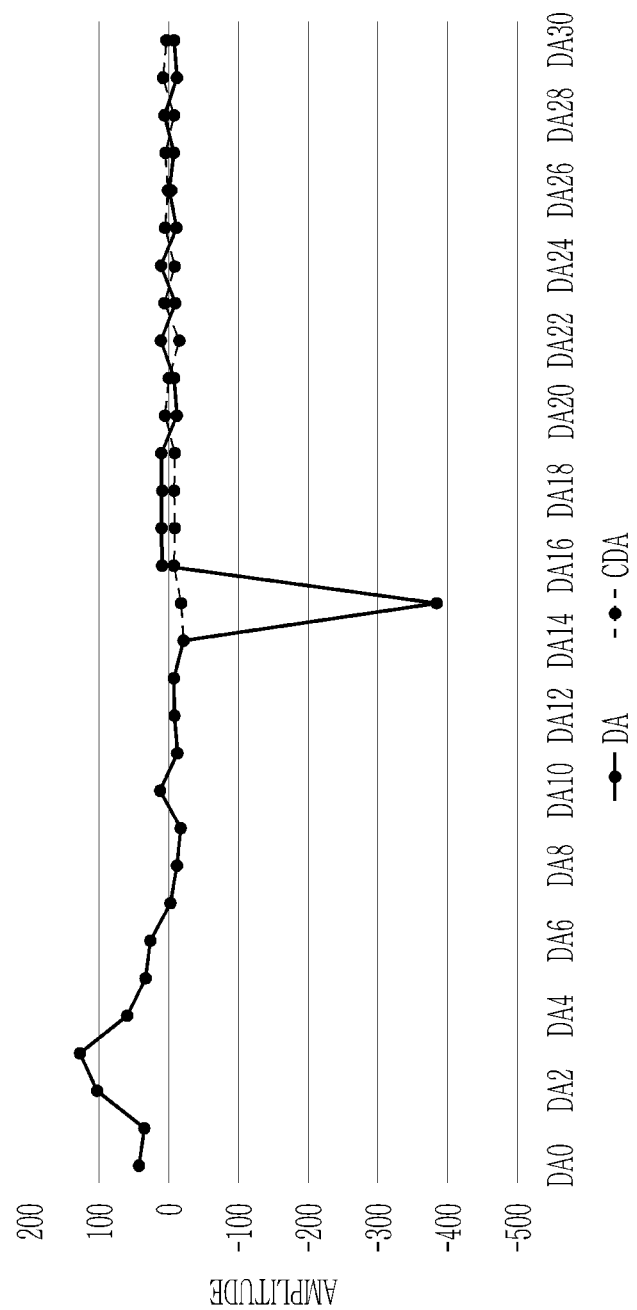

As shown in FIG. 9C, the output signals SA may be corrected to corrected output signals CSA. Then, as shown in FIG. 9D, the difference data items DA may also be corrected to corrected difference data items CDA.

In other words, the touch controller 2624 may correct the output signals SA of the second touch electrodes 121-16, 121-17, and 121-18, to which the traces are connected in a direction different from the trace connection direction of the second touch electrodes 121-13, 121-14, and 121-15, to the corrected output signals CSA, and generate the corrected difference data items CDA using the corrected output signals. Therefore, according to an example embodiment, it is possible to eliminate touch misrecognition due to a change in the connection directions of the traces to the touch electrodes although a touch by the stylus pen 10a or 10b has not occurred.

Now, the operation of the first driver/receiver 2620 when the first driver/receiver receives a detection signal from the touch electrodes 121 will be described with reference to FIG. 10A, FIG. 10B, FIG. 11A, FIG. 11B, FIG. 11C, and FIG. 11D.

Figure 10A:
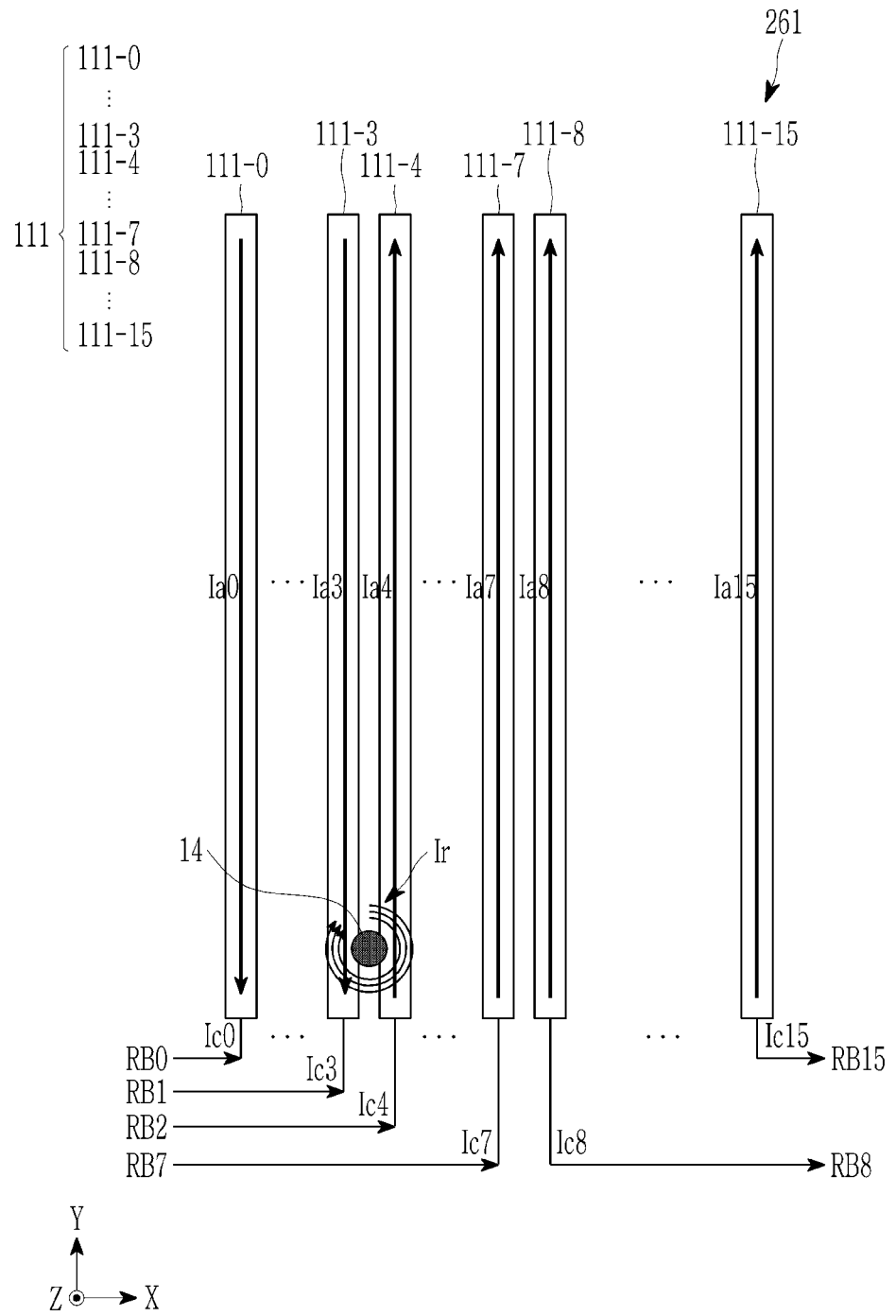
FIG. 10A is a view illustrating a second electrode of a touch device according to an example embodiment.
Figure 10B:
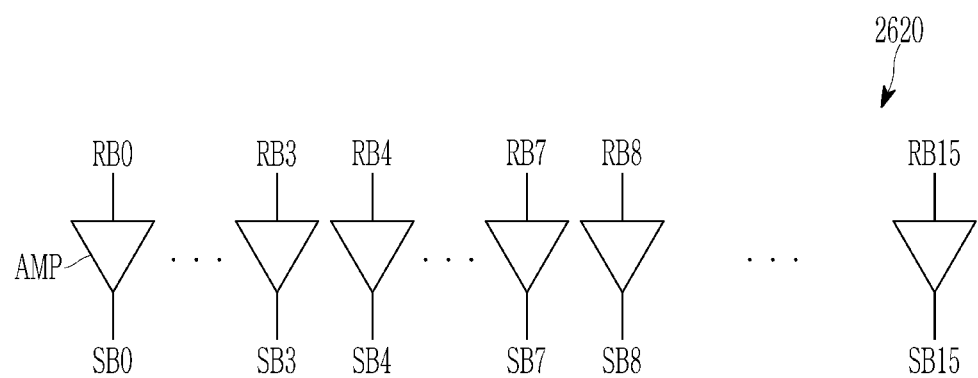
FIG. 10B is a view illustrating a receiver of the touch device according to the example embodiment.

FIG. 10A is a view illustrating a second electrode of a touch device according to an example embodiment, and FIG. 10B is a view illustrating a receiver of the touch device according to the example embodiment, and FIG. 11A, FIG. 11B, FIG. 11C, and FIG. 11D are graphs illustrating output signals and difference data of a touch device according to an example embodiment. Referring to FIG. 10A, the inductor unit 14 of the stylus pen 10a or 10b may be positioned on the touch screen 20 between two adjacent first touch electrodes 111-3 and 111-4.

In an example embodiment, the first ends of the first touch electrodes 111-0 to 111-15 (ends oriented to the negative direction of the Y axis) may be connected to traces RB0 to RB15. In this case, third traces RB0 to RB7 of the traces RB0 to RB15 may extend in the negative direction of the X axis, and the other fourth traces RB8 to RB15 may extend in the positive direction of the X axis.

In some example embodiments, the stylus pen 10a or 10b may be resonated by a driving signal applied to a touch electrode (for example, the reference symbol "111" or the reference symbol "121" in FIG. 7) having two signal input terminals. This resonance may cause a current Ir to flow in the coil of the inductor unit 14. This current Ir may cause eddy current in the touch electrodes 111. These eddy current may be formed in the opposite direction to the direction of the current Ir.

For example, in the first touch electrodes 111-0 to 111-3 positioned on the left side of the inductor unit 14 (the negative direction of the X axis), current Ia0 to Ia3 may be generated in the negative direction of the Y axis, and in the first touch electrodes 111-4 to 111-15 positioned on the right side of the inductor unit 14 (the positive direction of the X axis), current Ia4 to Ia15 may be generated in the positive direction of the Y axis. In other words, the direction of the current Ia0 to Ia3 induced in the first touch electrodes 111-0 to 111-3 and the direction of the current Ia4 to Ia15 induced in the first touch electrodes 111-4 to 111-15 may be opposite to each other.

When the inductor unit 14 of the stylus pen 10a or 10b is adjacent to the traces RB0 to RB15, the current Ir may cause eddy current even in the traces RB0 to RB15. For example, current Ic8 to Ic15 may be generated in the traces RB8 to RB15 in the positive direction of the X axis. In the third traces RB0 to RB7 extending in the negative direction of the X axis, current may be generated in such a direction that the current flows into the first touch electrodes 111-0 to 111-7, and in the fourth traces RB8 to RB15 extending in the positive direction of the X axis, current may be generated in such a direction that the current flows out from the first touch electrodes 111-8 to 111-15. In other words, the directions of the current which is generated by the inductor unit 14 may be opposite to each other depending on the extension direction of the traces RB0 to RB15.

As for the directions of current between the first touch electrodes 111-0 to 111-15 and the traces RB0 to RB15 at a point in time, the directions of the current Ia3 and the current Ic3 are opposite to each other, and the current Ia3 is larger than the current Ic3, so current (Ia3–Ic3) may flow from the first touch electrode 111-3 into the third trace RB3. Since the direction of the current Ia4 to Ia7 and the direction of the current Ic4 to Ic7 are the same, current (Ia4+Ic4, . . . , and Ia7+Ic7) may flow from the third traces RB4 to RB7 into the first touch electrodes 111-4 to 111-7. Since the direction of the current Ia8 to Ia15 may be opposite to the direction of the current Ic8 to Ic15, and the magnitudes of the current may differ depending on how close the inductor unit 14 is to the fourth traces RB8 to RB15, the current may be generated so as to flow from the first touch electrodes 111-8 to 111-15 into the fourth traces RB8 to RB15 or flow out from the first touch electrodes. The following description will be made on the assumption that the magnitude of the current Ia8 generated in the first touch electrode 111-8 is larger than the magnitude of the current Ic8 generated in the fourth trace RB8

Referring to FIG. 10B, the first driver/receiver 2620 may include a plurality of amplifiers AMP. Each amplifier AMP may have one input terminal and one output terminal. The plurality of traces RB0 to RB15 may be connected to the input terminals of corresponding amplifiers AMP, respectively. The output signals SB0 to SB15 of the individual amplifiers AMP may be transmitted to the controller (the reference symbol "2624" in FIG. 6). The controller 2624 may receive the output signals SB0 to SB15, and determine the touch point.

Figure 11A:
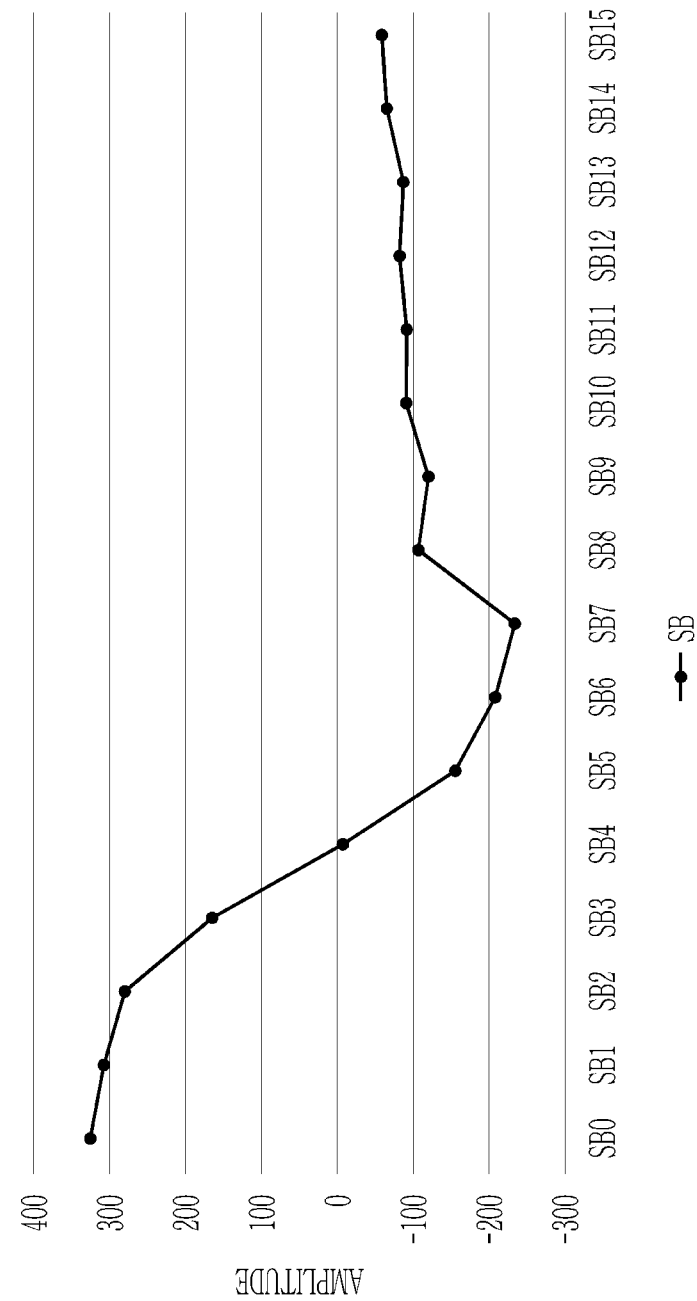
FIG. 11A, FIG. 11B, FIG. 11C, and FIG. 11D are graphs illustrating output signals and difference data of a touch device according to an example embodiment.

A method of determining a touch point will be described with reference to FIG. 11A and FIG. 11B. As shown in FIG. 11A, the output signals SB may be expressed as voltages. In FIG. 10A, the inductor unit 14 is positioned between the first touch electrode 111-3 and the first touch electrode 111-4, so the output signal SB3 and the output signal SB4 may have values closer to zero than the other output signals SB0 to SB2 and SB5 to SB15. A current (Ia3−Ic3) may flow into the third trace RB3 connected to the first touch electrode 111-3, and a current (Ia4+Ic4) may flow out from the third trace RB4 connected to the first touch electrode 111-4. Therefore, the sign of the output signal SB3 and the sign of the output signal SB4 may be different.

The touch controller (the reference symbol "2624" in FIG. 6) may determine the touch position, using the differences between the output signals SB0 to SB15. FIG. 11B shows difference data items DB on the differences between the output signals from two adjacent touch electrodes among the output signals SB0 to SB15. The touch controller 2624 may determine the touch position using the difference data items DB0 to DB14 by a touch position calculation method such as a center-of-gravity method. When the touch position is determined using the difference data items DB0 to DB14, the touch position may be calculated as a position between two of the first touch electrodes 111-0 to 111-15, which output two output signals to be the base of a difference data item, by the center-of-gravity method. In other words, the center-of-gravity method may determine the touch position by calculating the product of the amplitude of a signal and the position at which the corresponding signal was detected, as the center of gravity; however, since the positions at which the difference data items DB0 to DB14 were detected are not actual, the position between two first touch electrodes which output two output signals to be the base of one of the difference data items DB0 to DB14 may be determined as the touch position by the center-of-gravity method.

In an example embodiment, when the first driver/receiver 2620 includes a plurality of differential amplifiers, and each differential amplifier outputs a difference data item between two first touch electrodes, the touch controller 2624 may determine the touch position using the difference data item output from the differential amplifier, without calculating a separate difference data item.

Figure 11B:
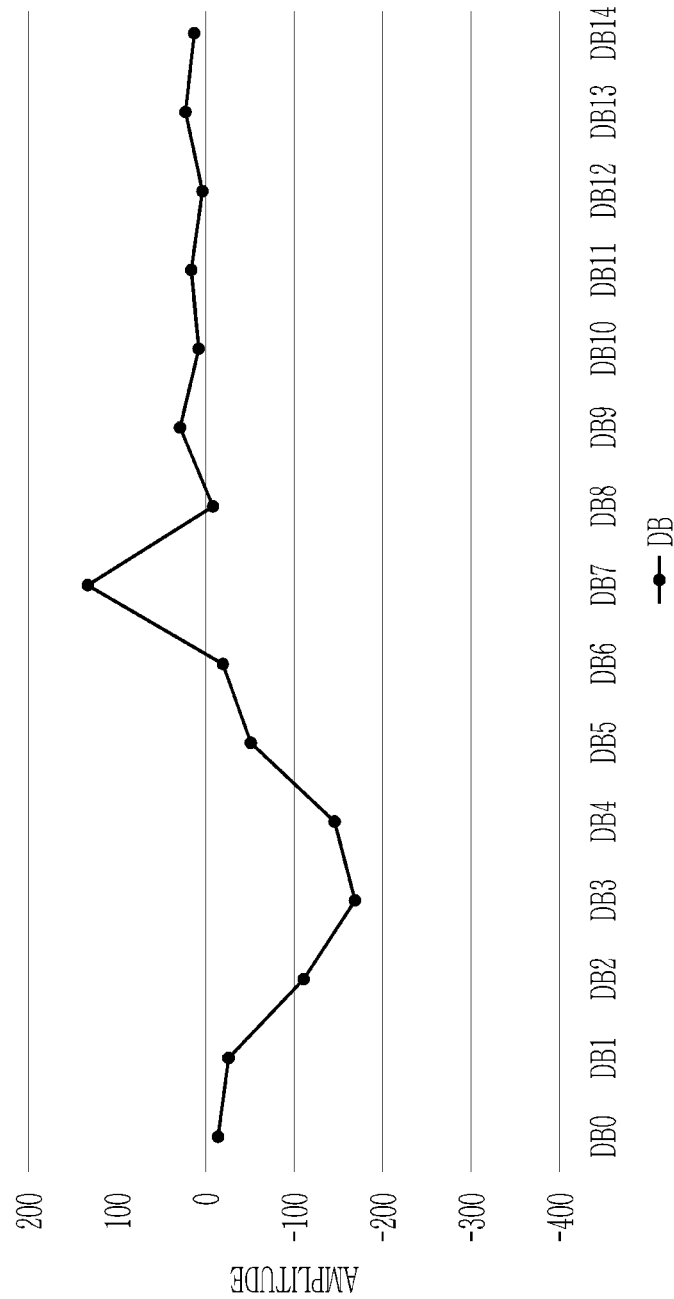
Figure 11C:
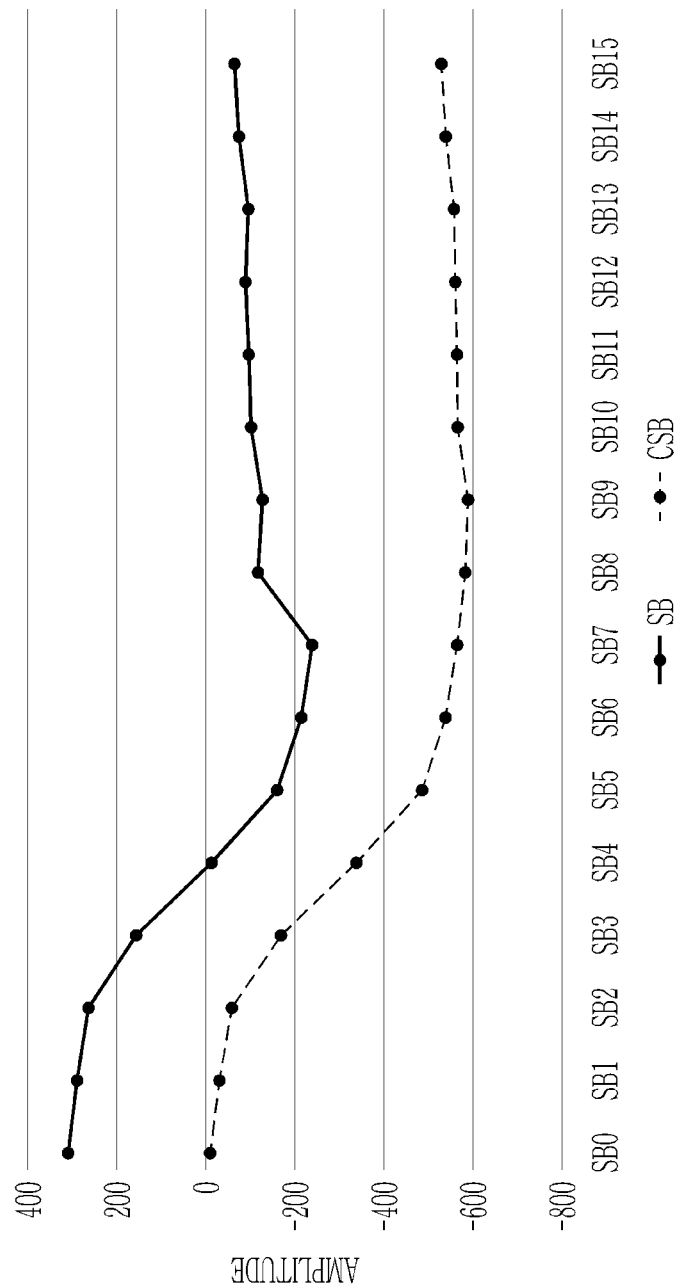
Figure 11D:
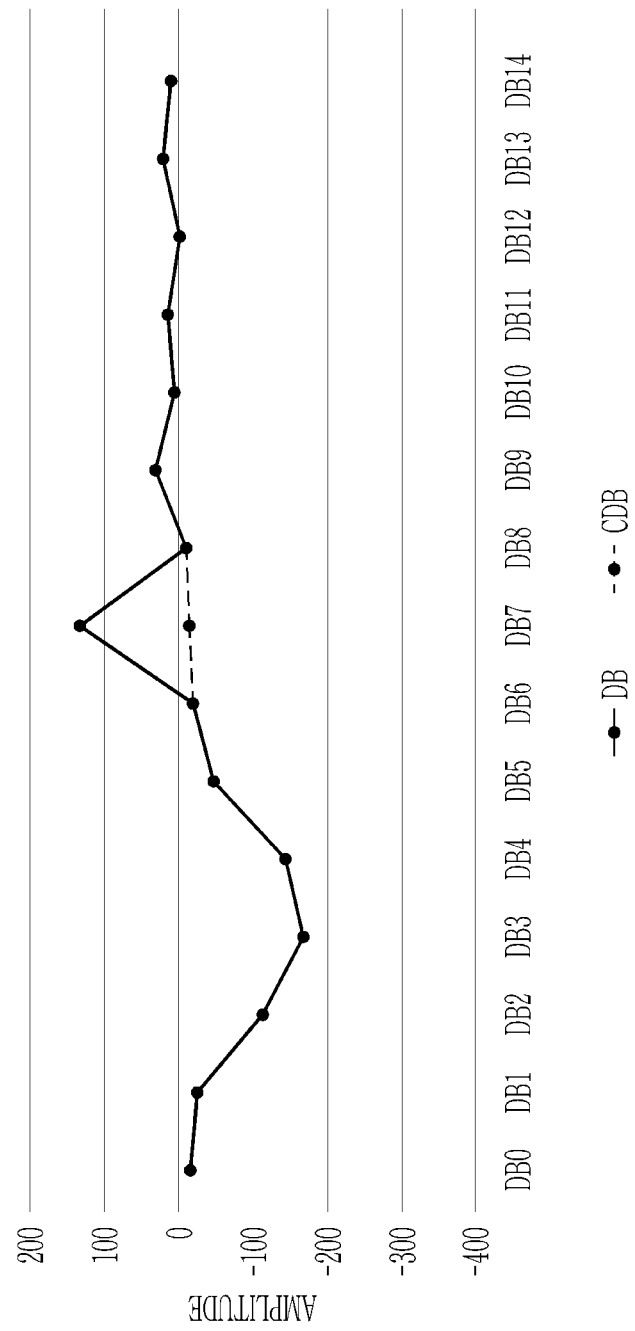

Since it is difficult to apply the center-of-gravity method to the output signals SB0 to SB15 in FIG. 11A, the touch controller 2624 may obtain the difference data items DB0 to DB14 as shown in FIG. 11B by calculating the differences between the output signals SB0 to SB15, and determine the touch position using the magnitudes of the difference data items DB0 to DB14. Meanwhile, a specific difference data item may be generated using output signals output from two traces which extend in opposite directions and in which current flows in the same direction. For example, the difference data item DB7 may be generated by the output signals SB7 and SB8 output from the third trace RB7 and the third trace RB8 which extend in the negative direction of the X axis and the positive direction of the X axis, respectively, and in which the current is generated in the same direction (the positive direction of the X axis). In other words, the output signals SB7 and SB8 having different signs may be input to an amplifier AMP of the first driver/receiver 2620. The difference data item DB7 based on the difference between the output signals SB7 and SB8 having different signs may have magnitudes larger than those of the other difference data items DB0, DB2 to DB6, and DB8 to DB14. Therefore, although a touch by the stylus pen 10a or 10b has not actually occurred, the controller 2624 may determine that a touch has occurred between the first touch electrode 111-7 and the first touch electrode 111-8 connected to the traces RB7 and RB8.

In an example embodiment, the touch controller 2624 may correct the output signals SB8 to SB15, using the output signals SB5 to SB10 transmitted from the first touch electrodes 111-5 to 111-7 and the first touch electrodes 111-8 to 111-10 different from each other in the extension directions of the traces. For example, the touch controller 2624 may correct the output signals SB8 to SB15 related to the first touch electrodes 111-8 to 111-15 by grouping the plurality of output signals SB5 to SB10 into two groups and approximating each group by an n-th order function and calculating the coefficients of the two n-th order functions. In this case, one group may include (n+1) number of output signals. Hereinafter, in the case of n=3, one group may include four output signals SB5 to SB8, and the other group may include four output signals SB7 to SB10. Then, the touch controller 2624 may approximate the output signals SB5 to SB8 by a cubic function, and approximate the output signals SB7 to SB10 by a cubic function. A method of calculating the touch signals SB5 to SB10 related to the first touch electrodes 111-5 to 111-8 may be performed by applying the above Equations 1 to 15 in the same way.

In some example embodiments, when it is determined that a touch position determined from the second touch electrodes 121-0 and 121-31 is within a predetermined distance from the traces RB0 to RB15, the touch controller 2624 may correct the output signals SB8 to SB15. When the position of the inductor unit 14 is adjacent to the traces RB0 to RB15, that is, when the position of the inductor unit is adjacent to the traces RB0 to RB15 in the Y-axis direction, the magnitudes of the current which is generated in the traces RB0 to RB15 increase by the magnitudes of the current applied to the first touch electrodes 111-0 to 111-15, the touch controller 2624 may correct the output signals SB8 to SB15.

Figure 12:
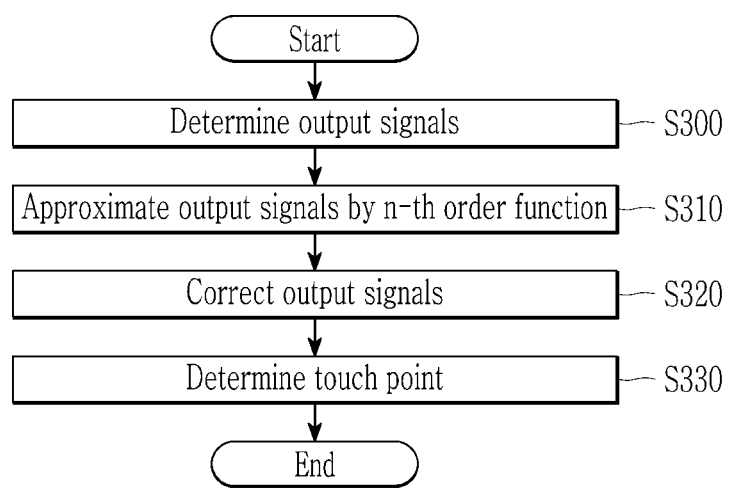
FIG. 12 is a flow chart illustrating a driving method of a touch device according to an example embodiment.

FIG. 12 is a flow chart illustrating a driving method of a touch device according to an example embodiment.

The touch device determines output signals (S300). In an example embodiment, when the individual touch electrodes are connected to single ended amplifiers, the touch device may receive the output signals of the touch electrodes. When two corresponding touch electrodes are connected to one corresponding differential amplifier together, the touch device may determine the output signals of the individual touch electrodes, as shown in Equation 2.

The touch device approximates the output signals by an n-th order function (S310). The touch device may group the output signals into two groups such that each group includes the output signals of two touch electrodes different from each other in the directions of the traces connected to the touch electrodes, and approximate the two groups by n-th order functions, respectively. The touch device may calculate the coefficients of each n-th order function, using the two n-th order functions.

The touch device corrects the output signals using the n-th order functions (S320)

The touch device may correct the output signals of the individual touch electrodes to the result values of the n-th order functions.

The touch device determines the touch point using the output signals (S330). The touch device may generate a difference data item by calculating the difference between the output signals of two touch electrodes, and determine the touch point using the difference data item by a center-of-gravity method, etc.

Figure 13:
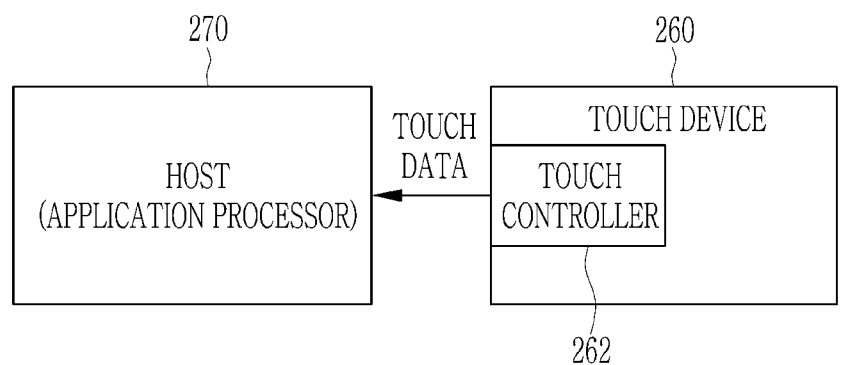
FIG. 13 is a block diagram illustrating a touch module and a host.
Figure 14:
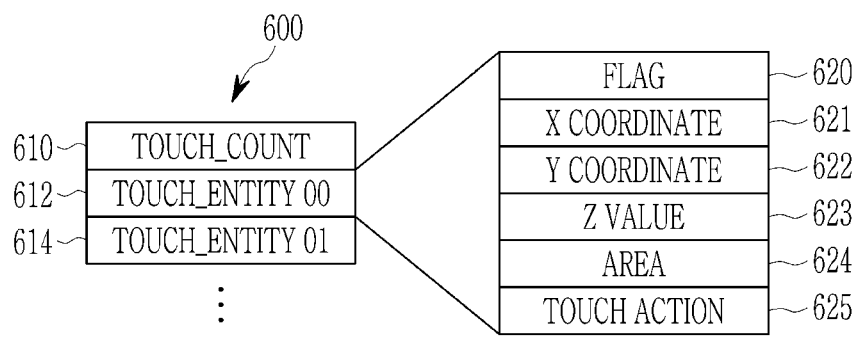
FIG. 14 is a view illustrating an example of touch data which is provided from the touch module to the host.

FIG. 13 is a block diagram illustrating a touch module and a host, and FIG. 14 is a view illustrating an example of touch data which is provided from the touch module to the host.

Referring to FIG. 13, a host 270 may receive touch data from the touch controller 262 included in the touch module 260. For example, the host 270 may be a mobile system-on-chip (SOC), an application processor (AP), a media processor, a microprocessor, a central processing unit (CPU), or a device similar thereto.

After one frame ends, the touch module 260 may generate information on touches applied during the one frame, as touch data, and transmit the touch data to the host 270.

Referring to FIG. 13 and FIG. 14, touch data 600 may be transmitted from the touch module 260 to the host 270, and include a touch count field 610 and at least one touch entity field (612, 614). Besides, the touch data 600 may further include sensor input data from the stylus pen 10, data representing resonance signal change, etc.

In the touch count field 610, a value indicating the number of touches applied during one frame period may be written. The touch entity field (612, 614) may include fields representing information items related to each touch input. For example, the touch entity field (612, 614) may include a flag field 620, an X coordinate field 621, a Y coordinate field 622, a Z value field 623, an area field 624, and a touch action field 625.

The number of touch entity fields (612, 614) may be the same as the value written in the touch count field 610.

In the flag field 620, a value indicating a touch object may be written. For example, different values indicating a finger, a palm, and a stylus pen may be written in the flag field 620. In the X coordinate field 621 and the Y coordinate field 622, values indicating calculated touch coordinates may be written. In the Z value field 623, a value corresponding to the signal strength of a detection signal may be written. In the area field 624, a value corresponding to the area of a touched area may be written.

According to example embodiments, the host 270 receiving the touch data 600 may determine that the touch object is a finger, when the touch area indicated by the value in the area field 624 is larger than a threshold, and determine that the touch object is the stylus pen 10, when the touch area is equal to or smaller than the threshold.

According to example embodiments, the host 270 receiving the touch data 600 may identify whether the touch object is a finger or the stylus pen 10, using the value of the flag field 620.

The electronic device according to various example embodiments disclosed in this specification may be various types of devices. Examples of the electronic device may include portable communication devices (such as smart phones), computer devices, portable multimedia devices, portable medical appliances, cameras, wearable devices, or home appliances. The electronic device according to the example embodiments in this specification is not limited to the above-mentioned devices.

It should be understood that the example embodiments in this specification and the terms used therein are not intended to limit the technical features described in this specification to specific example embodiments; rather, the present disclosure should be construed to cover various modifications, equivalents, or alternatives of the example embodiments. In describing the drawings, similar reference symbols may be used to designate similar or related constituent elements. The singular form of a noun referring to an item may include one or more identical items unless the related context clearly indicates otherwise. In this specification, each of the phases "A or B", "at least one of A and B", "at least one of A or B", "A, B, or C", "at least one of A, B, and C", and "at least one of A, B, or C" may include all possible combinations of items enumerated together with the corresponding phrase of the phases The terms "first", "second", or the like may be used to distinguish a corresponding element from another corresponding element, and do not limit the corresponding elements in other respects (for example, importance or order). When one element (for example, a first element) is referred to as being "(operatively or communicatively) coupled with/to or connected to" another element (for example, a second element), this may mean that the one element may be connected to the other element directly (for example, by wire), wireless, or via a third element.

The term "module" used in this specification may include a unit configured with hardware, software, or firmware, and may be interchangeably used with the term "logic", "logical block", "component", "circuit", or the like. A module may be an integrated component or a minimum unit or part of the component for performing one or more functions. For example, according to an example embodiment, a module may be implemented in the form of an application-specific integrated circuit (ASIC).

The example embodiments in this specification may be configured with software (for example, a program) including one or more commands and stored in a storage medium (for example, an internal memory or an external memory) readable by a machine (for example, an electronic device). For example, a processor of the machine (for example, a processor of an electronic device) may invoke at least one command of the one or more stored commands from the storage medium, and execute them. This enables the machine to be operated to perform at least one function according to at least one invoked command. The one or more commands may include code generated by a compiler or code executable by an interpreter. The machine-readable storage medium may be provided in the form of a non-transitory storage medium. Here, the term "non-transitory" means that the storage medium is a tangible device and does not include a signal (for example, an electromagnetic wave), and this term does not distinguish between when data is semi-permanently stored on the storage medium and when data is temporarily stored on the storage medium.

According to an example embodiment, the methods according to the example embodiments disclosed in this specification may be included in computer program products to be provided. The computer program products may be transacted as commodities between sellers and purchasers. The computer program products may be distributed in the form of a machine-readable storage medium (for example, a compact disc read only memory (CD-ROM)) or may be distributed (downloaded or uploaded) through application stores (for example, Play Store™), or directly or online between two user devices (for example, smart phones). In the case of online distribution, at least a portion of a computer program product may be at least temporarily stored on a machine-readable storage medium such as a memory of a manufacturer's server, an application store server, or a relay server, or temporarily generated.

According to various example embodiments, each constituent element (for example, a module or a program) of the above-mentioned constituent elements may include a singular or a plurality of entities. According to various example embodiments, one or more constituent elements of the above-mentioned corresponding constituent elements, or operations may be omitted, or one or more other constituent elements or operations may be added. Alternatively or additionally, a plurality of constituent elements (for example, modules or programs) may be integrated into a single constituent element. In such a case, the integrated constituent element may perform one or more functions of each constituent element of the plurality of constituent elements in the way same as or similar to the way in which the corresponding constituent element of the plurality of constituent elements in the nonintegrated state performs the one or more functions. According to various example embodiments, operations which are performed by a module, a program, or any other constituent element may be performed sequentially, in parallel, repeatedly, or heuristically, or one or more of the operations may be performed in a different order, or omitted, or one or more other operations may be added.

What is claimed is:

1. A touch device comprising:
   a plurality of touch electrodes extending in a first direction, arranged along a second direction intersecting the first direction, and spaced apart from each other, wherein each of the plurality of touch electrodes has a first end and a second end;
   a plurality of first traces that is connected to the first ends of a plurality of first touch electrodes among the plurality of touch electrodes, the plurality of first traces being not connected to the second ends of the plurality of first touch electrodes;
   a plurality of second traces that is connected to the second ends of a plurality of second touch electrodes among the plurality of touch electrodes, the plurality of second traces being not connected to the first ends of the plurality of second touch electrodes; and
   a touch controller configured to correct a plurality of first output signals received through the plurality of first traces, based on a first reference output signal of a first-first touch electrode among the plurality of first output signals and a second reference output signal of a second-first touch electrode among a plurality of second output signals received through the plurality of second traces, wherein the first-first touch electrode is a first touch electrode adjacent to the plurality of second touch electrodes among the plurality of first touch electrodes, and the second-first touch electrode is a second touch electrode adjacent to the plurality of first touch electrodes among electrode among the plurality of second touch electrodes.

2. The touch device of claim 1, wherein
   the touch controller is further configured to identify at least one first output signal of the plurality of first output signal and at least one second output signal of the plurality of second output signals into two groups, and approximate each of the two groups by an n-th order function, wherein n is a positive number.

3. The touch device of claim 2, wherein
   the touch controller is further configured to group n number of first output signals of the plurality of first output signals and second reference output signal into one group of the two groups, and group the first reference output signal and n number of second output signals of the plurality of second output signals into the other group of the two groups.

4. The touch device of claim 2, wherein
   the touch controller is further configured to calculate coefficients of the two n-th order functions, and correct the plurality of first output signals and/or the second output signals using the two n-th order functions.

5. The touch device of claim 1, wherein
   the touch controller is further configured to determine a touch position by calculating the difference between two of the plurality of corrected first output signals and/or the corrected second output signals.

6. The touch device of claim 1, wherein
   a current in a first direction is induced in some of the plurality of touch electrodes by a resonance circuit of a stylus pen adjacent to the plurality of touch electrodes, and a current in a direction opposite to the first direction is induced in another part of the touch electrodes among the plurality of touch electrodes.

7. The touch device of claim 6, wherein
   when the directions of the currents induced in two adjacent touch electrodes of the plurality of touch electrodes are different, the touch controller is further configured to determine the position between the two adjacent touch electrodes, as the position of the stylus pen.

8. The touch device of claim 6, wherein
   currents in the same direction are induced in a first touch electrode adjacent to the plurality of second touch electrodes and a second touch electrode adjacent to the plurality of first touch electrodes by the resonance circuit.

9. A touch device comprising:
   a plurality of touch electrodes extending in a first direction, arranged along a second direction intersecting the first direction, and spaced apart from each other;
   a plurality of first traces that is connected to a plurality of first touch electrodes of the plurality of touch electrodes, respectively, and extends in the first direction, the plurality of first traces being not connected to the second ends of the plurality of first touch electrodes;
   a plurality of second traces that is connected to a plurality of second touch electrodes of the plurality of touch electrodes, respectively, and extends in a third direction opposite to the first direction, the plurality of second traces being not connected to the first ends of the plurality of second touch electrodes; and
   a touch controller configured to correct a plurality of first output signals received through the plurality of first traces, based on a first reference output signal of a first-first touch electrode among the plurality of first output signals and a second reference output signal of a second-first touch electrode among a plurality of second output signals received through the plurality of second traces, wherein the first-first touch electrode is a first touch electrode adjacent to the plurality of second touch electrodes among the plurality of first touch electrodes, and the second-first touch electrode is a second touch electrode adjacent to the plurality of first touch electrodes among electrode among the plurality of second touch electrodes.

10. The touch device of claim 9, wherein
    the touch controller is further configured to identify at least one first output signal of the plurality of first output signal and at least one second output signal of the plurality of second output signals into two groups, and approximates each of the two groups by an n-th order function (wherein n is a positive number).

11. The touch device of claim 10, wherein
    the touch controller is further configured to group n number of first output signals of the plurality of first output signals and second reference output signal into one group of the two groups, and group the first reference output signal and n number of second output signals of the plurality of second output signals into the other group of the two groups.

12. The touch device of claim 9, wherein
the touch controller is further configured to calculate coefficients of the two n-th order functions, and corrects the plurality of first output signals and/or the second output signals using the two n-th order functions.

13. The touch device of claim 9, wherein
the touch controller is further configured to determine a touch position by calculating the difference between two of the plurality of corrected first output signals and/or the corrected second output signals.

14. The touch device of claim 9, wherein
a current in a first direction is induced in some of the plurality of touch electrodes by a resonance circuit of a stylus pen adjacent to the plurality of touch electrodes, a current in a direction opposite to the first direction is induced in another part of the touch electrodes among the plurality of touch electrodes.

15. The touch device of claim 14, wherein
when the directions of the current induced in two adjacent touch electrodes of the plurality of touch electrodes are different, the touch controller is further configured to determine the position between the two adjacent touch electrodes, as the position of the stylus pen.

16. The touch device of claim 14, wherein
currents in the same direction are induced in a first touch electrode adjacent to the plurality of second touch electrodes and a second touch electrode adjacent to the plurality of first touch electrodes by the resonance circuit.

17. The touch device of claim 14, wherein
currents in the same direction are induced in the plurality of first traces and the plurality of second traces by the resonance circuit.

18. A driving method of a touch device comprising:
receiving a plurality of first output signals from a plurality of first traces connected to first ends of a plurality of first touch electrodes of a plurality of touch electrodes, respectively, the plurality of first traces being not connected to second ends of the plurality of first touch electrodes, and receiving a plurality of second output signals from a plurality of second traces connected to second ends of a plurality of second touch electrodes of the plurality of touch electrodes, respectively, the plurality of second traces being not connected to first ends of the plurality of second touch electrodes, wherein the plurality of touch electrodes extend in a first direction, are arranged along a second direction intersecting the first direction, and are spaced apart from each other;

correcting the plurality of first output signals, using a first reference output signal of a first-first touch electrode among the plurality of first output signals and a second reference output signal of a second-first touch electrode among the plurality of second output signals, wherein the first-first touch electrode is a first touch electrode adjacent to the plurality of second touch electrodes among the plurality of first touch electrodes, and the second-first touch electrode is a second touch electrode adjacent to the plurality of first touch electrodes among electrode among the plurality of second touch electrodes; and determining a touch position based on the plurality of corrected first output signals.

19. The driving method of the touch device according to claim 18, wherein
correcting the plurality of first output signals and/or the second output signals includes the following:
identifying at least one first output signal of the plurality of first output signal and at least one second output signal of the plurality of second output signals into two groups;
approximating each of the two groups by an n-th order function (wherein n is a positive number);
calculating coefficients of the two n-th order functions; and
correcting the plurality of first output signals and/or the second output signals using the two n-th order functions.

20. The driving method of the touch device according to claim 19, wherein
determining the touch position includes determining the touch position by calculating the difference between two of the plurality of corrected first output signals and/or the corrected second output signals.

* * * * *